(12) United States Patent
Matsuo

(10) Patent No.: US 8,184,388 B2
(45) Date of Patent: May 22, 2012

(54) IMAGE FORMING OPTICAL SYSTEM AND ELECTRONIC IMAGE PICKUP APPARATUS USING THE SAME

(75) Inventor: Keigo Matsuo, Akiruno (JP)

(73) Assignee: Olympus Corporation, Tokyo (JP)

( * ) Notice: Subject to any disclaimer, the term of this patent is extended or adjusted under 35 U.S.C. 154(b) by 127 days.

(21) Appl. No.: 12/658,397

(22) Filed: Feb. 8, 2010

(65) Prior Publication Data

US 2010/0208321 A1    Aug. 19, 2010

(30) Foreign Application Priority Data

Feb. 18, 2009  (JP) .................. 2009-035310

(51) Int. Cl.
*G02B 9/12* (2006.01)
*G02B 9/34* (2006.01)
*G02B 15/14* (2006.01)

(52) U.S. Cl. ........ 359/797; 359/687; 359/774; 359/784; 359/796

(58) Field of Classification Search .................. 359/797, 359/796, 687, 784–788, 774
See application file for complete search history.

(56) References Cited

U.S. PATENT DOCUMENTS

| 7,289,273 B2 * | 10/2007 | Mihara .......................... 359/676 |
| 7,289,281 B1 * | 10/2007 | Sugita ........................... 359/797 |
| 2008/0123191 A1 * | 5/2008 | Suzaki et al. .................. 359/555 |

FOREIGN PATENT DOCUMENTS

JP        2007-226142       9/2007

OTHER PUBLICATIONS

M. Born, et al., "*Principles of Optics*," 6th (Corrected) Ed., Cambridge University Press, p. 161-162 (1997).

* cited by examiner

*Primary Examiner* — Scott J Sugarman
*Assistant Examiner* — Zachary Wilkes
(74) *Attorney, Agent, or Firm* — Kenyon & Kenyon LLP

(57) ABSTRACT

An image forming optical system of the present invention includes at least one cemented lens which includes a first lens element (e1), a second lens element (e2), and a third lens element (e3). The first lens element e1 is cemented to a surface on one side of the second lens element e2, and the third lens element e3 is cemented to the other surface of the second lens element e2. The first lens element e1 is a positive lens, and a combined refracting power of the second lens element e2 and the third lens element e3 is negative. The cemented lens satisfies a predetermined conditional expression.

12 Claims, 17 Drawing Sheets

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2009-35310 filed on Feb. 18, 2008; the entire contents of which are incorporated herein by reference.

BACKGROUND OF THE INVENTION

1. Field of the Invention

The present invention relates to an image forming optical system and an electronic image pickup apparatus using the same.

2. Description of the Related Art

As a zoom lens system for an image pickup apparatus with a high zooming ratio in which, an image pickup element of a large number of pixels is used, a zoom lens system disclosed in Japanese Patent Application Laid-open Publication No. 2007-226142 is available. This zoom lens system includes a first lens unit, a second lens unit, and a third lens unit. Here, the third lens unit includes a cemented lens. Moreover, this cemented lens has a sandwich structure in which, a resin having a specific partial dispersion ratio and Abbe's number is sandwiched.

SUMMARY OF THE INVENTION

An image forming optical system according to a first aspect of the present invention includes
at least one cemented lens, and
the cemented lens includes a first lens element e1, a second lens element e2, and a third lens element e3, and
the first lens element is cemented to a surface on one side of the second lens element e2, and the third lens element e3 is cemented to the other surface of the second lens element e2, and
the first lens element e1 is a positive lens, and a combined refracting power of the second lens element e2 and the third lens element e3 is negative, and
the image forming optical system satisfies the following conditional expression (1)

$$2.15 < N_{eff} - 0.01 v_{eff} < 15.0 \quad (1)$$

where,
Neff denotes an effective refractive index when the cemented lens is assumed to be one lens, and is expressed by the following expression $$N_{eff} = \frac{1}{P \cdot F_{eff}} \text{ where } P = \sum_{i=1}^{3} \frac{1}{n_i f_i} \quad \frac{1}{F_{eff}} = \sum_{i=1}^{3} \frac{1}{f_i}$$

and
v eff is an effective Abbe's number when the cemented lens is assumed to be one lens, and is expressed by the following expression $$v_{eff} = \frac{1}{F_{eff} \cdot \sum_{i=1}^{3} \frac{1}{f_i \cdot v_{d,i}}}$$

where,
P denotes Petzval's sum,
Feff is a combined focal length of the cemented lens when three lenses are in close contact as the cemented lens, and each lens element is let to be thin,
fi is a focal length of a lens element which forms the cemented lens, and
v d,i is Abbe's number for the lens element which forms the cemented lens.

Moreover, an electronic image pickup apparatus according to a second aspect of the present invention includes an image forming optical system according to the first aspect of the present invention, and an electronic image pickup element.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at a wide angle end, FIG. 2B shows an intermediate state, and FIG. 2C shows a state at a telephoto end;

FIG. 3A shows a state at a wide angle end, FIG. 3B shows an intermediate state, and FIG. 3C shows a state at a telephoto end;

FIG. 4A shows a state at a wide angle end, FIG. 4B shows an intermediate state, and FIG. 4C shows a state at a telephoto end;

FIG. 5A shows a state at a wide angle end, FIG. 5B shows an intermediate state, and FIG. 5C shows a state at a telephoto end;

FIG. 6A shows a state at a wide angle end, FIG. 6B shows an intermediate state, and FIG. 6C shows a state at a telephoto end;

FIG. 7A shows a state at a wide angle end, FIG. 7B shows an intermediate state, and FIG. 7C shows a state at a telephoto end;

FIG. 8A shows a state at a wide angle end, FIG. 8B shows an intermediate state, and FIG. 8C shows a state at a telephoto end;

FIG. 9A shows a state at a wide angle end, FIG. 9B shows an intermediate state, and FIG. 9C shows a state at a telephoto end;

FIG. 10A shows a state at a wide angle end, FIG. 10B shows an intermediate state, and FIG. 10C shows a state at a telephoto end;

FIG. 17A is a front view of a cellular phone 400, FIG. 17B is a side view of the cellular phone 400, and FIG. 17C is a cross-sectional view of a photographic optical system 405.

DETAILED DESCRIPTION OF THE PREFERRED EMBODIMENTS

Figure 1A:
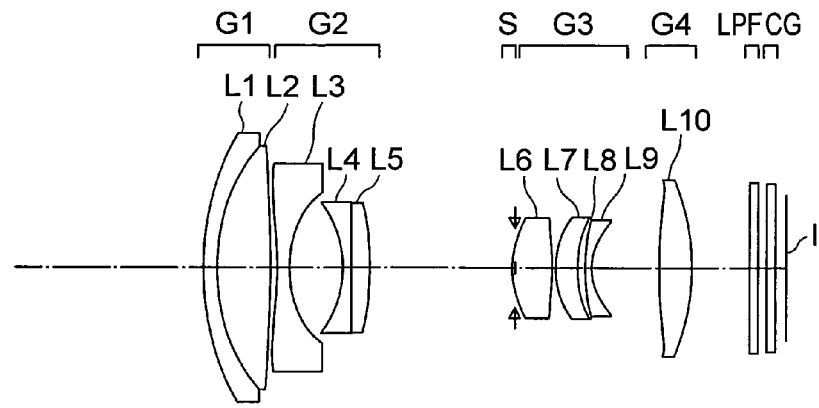
FIG. 1A, FIG. 1B, and FIG. 1C are cross-sectional views along an optical axis showing an optical arrangement at a time of infinite object point focusing according to a first embodiment of a zoom lens system of the present invention, where.

Prior to describing embodiments, an action and an effect of an image forming optical system of the embodiment will be described below.

The image forming optical system of the present embodiment is an image forming optical system having at least one cemented lens. This cemented lens includes a first lens element e1, a second lens element e2, and a third lens element e3. Here, the first lens element e1 is cemented to a surface on one side of the second lens element e2, and the third lens element e3 is cemented to the other surface of the second lens element e2. Moreover, the first lens element e1 is a positive lens, and a combined refracting power of the second lens element e2 and the third lens element e3 is negative. In the following description, the refracting power is called as 'power'.

The image forming optical system having such structure has at least one cemented lens which satisfies the following conditional expression (1).

$$2.15 < N_{\mathit{eff}} - 0.01 \nu_{\mathit{eff}} < 15.0 \quad (1)$$

where,

Neff denotes an effective refractive index when the cemented lens is assumed to be one lens, and is expressed by the following expression $$N_{\mathit{eff}} = \frac{1}{P \cdot F_{\mathit{eff}}} \text{ where } P = \sum_{i=1}^{3} \frac{1}{n_i f_i} \quad \frac{1}{F_{\mathit{eff}}} = \sum_{i=1}^{3} \frac{1}{f_i}$$

and

ν eff is an effective Abbe's number when the cemented lens is assumed to be one lens, and is expressed by the following expression $$\nu_{\mathit{eff}} = \frac{1}{F_{\mathit{eff}} \cdot \sum_{i=1}^{3} \frac{1}{f_i \cdot \nu_{d,i}}}$$

In the abovementioned expressions,

P denotes Petzval's sum,

Feff is a combined focal length of the cemented lens when three lenses are in close contact as the cemented lens, and each lens element is let to be thin, fi is a focal length of a lens element which forms the cemented lens, and ν d,i is Abbe's number for the lens element which forms the cemented lens.

According to such structure, in the image forming optical system of this embodiment, the cemented lens generates a chromatic aberration equivalent to a high-dispersion lens, and generates Petzval's sum equivalent to a high refractive index lens. By using this cemented lens in the image forming optical system, it is possible to correct the chromatic aberration and Petzval's sum of the image forming optical system.

It is preferable to let the power of the above-mentioned cemented lens to be negative. When an attempt is made to make short an overall length of an image forming optical system of a positive-lead type, since the power of each lens unit becomes strong, the Petzval's sum of the overall optical system becomes a substantial negative value. Therefore, a positive curvature of field is generated substantially. For suppressing the generation of the positive curvature of field, a refractive index of the negative lens may be made higher. Accordingly, the negative Petzval's sum comes closer to 0, and it is possible to suppress the generation of the substantial positive curvature of field.

Here, when the conditional expression (1) is satisfied, since an effective refractive index of the cemented lens becomes high, it is possible to correct the curvature of field favorably. Furthermore, when the conditional expression (1) is satisfied, since the cemented lens generates the chromatic aberration equivalent to the high-dispersion lens, it is possible to correct the chromatic aberration favorably.

When an upper limit in the conditional expression (1) is surpassed, since the effective refractive index of the cemented lens becomes excessively high, it is not possible to correct the curvature of field favorably. Whereas, when a lower limit in the conditional expression (1) is surpassed, since the effective refractive index of the cemented lens becomes excessively low, it is not possible to correct the curvature of field favorably.

Moreover, in the image forming optical system of this embodiment, it is preferable that the following conditional expression (1-1) is satisfied.

Moreover, when the following conditional expression (1-1) is satisfied, it is possible to correct the curvature of field favorably.

$$2.17 < Neff - 0.01 veff < 13.0 \tag{1-1}$$

Moreover, in the image forming optical system of this embodiment, when the image forming optical system is formed such that the power of the first lens unit is positive, the power of the second lens unit is negative, and the power of the rear lens units (lens units from the third lens unit onward) is positive, it is preferable that one of the lens units having the positive power from the third lens unit onward has at least one cemented lens.

In the image forming optical system of the positive-lead type, the chromatic aberration is corrected in the first lens unit and a coma aberration and astigmatism are corrected in the second lens unit. Therefore, it is not preferable to carry out the correction of the Petzval's sum in the first lens unit and the second lens unit, as it leads to deterioration of the chromatic aberration correction, and the coma aberration and astigmatism. Therefore, it is preferable to carry out the correction of the curvature of field by making an arrangement such that the Petzval's sum of the entire image forming optical system is brought close to 0 in the lens units from the third lens unit onward. In the image forming optical system of this embodiment, by disposing the cemented lens in one of the lens units having a positive power from the third lens unit onward, and by making high an effective refractive index of this cemented lens, the Petzval's sum comes closer to 0, and it is possible to correct the curvature of field favorably. Moreover, since the chromatic aberration equivalent to the high-dispersion lens is generated in the cemented lens, it is possible to correct the chromatic aberration favorably.

Moreover, in the image forming optical system of this embodiment, it is preferable that the third lens unit has at least one cemented lens.

In the image forming optical system of the positive-lead type, the chromatic aberration is corrected in the first lens unit and the coma aberration and the astigmatism are corrected in the second lens unit. Therefore, correcting the Petzval's sum in the first lens unit and the second lens unit is not favorable as it leads to deterioration of the chromatic aberration correction, and the coma aberration and the astigmatism. Therefore, it is preferable to carry out the correction of the curvature of field by making an arrangement such that the Petzval's sum of the entire image forming optical system is brought closer to 0 in the third lens unit. In the image forming optical system of this embodiment, by disposing the cemented lens in the third lens unit, and by making high an effective refractive index of this cemented lens, the Petzval's sum comes closer to 0, and it is possible to correct the curvature of field favorably. Moreover, since the cemented lens generates the chromatic aberration equivalent to the high-dispersion lens, it is possible to correct the chromatic aberration favorably.

In the image forming optical system of this embodiment, it is preferable that the lens unit having at least one cemented lens includes at least one positive lens et apart from the cemented lens. Moreover, it is preferable that the image forming optical system satisfies the following conditional expressions (2) and (3).

$$0.73 < Neff - Ndet < 13 \tag{2}$$

$$42 < vdet - veff < 100 \tag{3}$$

where,

Ndet and ν det denote a refractive index and Abbe's number respectively of the positive lens et.

When the conditional expression (2) is satisfied, it is possible to make substantial a difference between the effective refractive index of the cemented lens and the refractive index of the positive lens et. When an attempt is made to make short the overall length of the image forming optical system of the positive-lead type, the power of each lens unit becomes strong, and Petzval's sum of the overall optical system becomes a substantial negative value. Therefore, a positive curvature of field is generated substantially. For suppressing the generation of the positive curvature of field, a difference in the refractive indices of the positive lens and the negative lens in the unit of the positive power may be made substantial. By making such an arrangement, since it is possible to bring the negative Petzval's sum closer to 0, it is possible to suppress the generation of the substantial positive curvature of field.

When an upper limit in the conditional expression (2) is surpassed, the difference in the refractive indices of the positive lens and the negative lens becomes excessively substantial. Therefore, correction of the spherical aberration and the coma aberration becomes difficult. Whereas, when a lower limit in the conditional expression (2) is surpassed, the difference in the refractive indices of the positive lens and the negative lens becomes excessively small. Therefore, Petzval's sum for the lens unit having the cemented lens becomes a small positive value. Moreover, a substantial positive curvature field is generated as the overall optical system.

When the conditional expression (3) is satisfied, it is possible to make substantial a difference in an effective Abbe's number of the cemented lens and Abbe's number of the positive lens. By making substantial a difference in Abbe's numbers of the positive lens and the negative lens, it is possible to suppress the generation of a primary chromatic aberration. When an upper limit in the conditional expression (3) is surpassed, the correction of the primary chromatic aberration becomes excessive as the difference in Abbe's numbers becomes excessively substantial. When a lower limit in the conditional expression (3) is surpassed, the correction of the primary chromatic aberration becomes insufficient as the difference in Abbe's numbers becomes excessively small. By satisfying the conditional expressions (2) and (3) simultaneously, it is possible to correct the curvature of field and the primary chromatic aberration favorably.

Moreover, it is more preferable that the image forming optical system of this embodiment satisfies the following conditional expressions (2-1) and (3-1).

$$0.74 < Neff - Ndet < 11 \tag{2-1}$$

$$43 < vdet - veff < 90 \tag{3-1}$$

By satisfying the conditional expressions (2-1) and (3-1) simultaneously, it is possible to correct the curvature of field and the primary chromatic aberration favorably.

Moreover, it is preferable that the image forming optical system of this embodiment satisfies the following conditional expressions (4) and (5) simultaneously.

$$0 < R1e2 \tag{4}$$

$$1 < Rre2/R1e2 < 200 \tag{5}$$

where,

Rre2 denotes a radius of curvature of a surface on an image side of the second lens element e2, and R1e2 is a radius of curvature of a surface on an object side of the second lens element e2.

The conditional expression (4) indicates that the surface on the object side of the second lens element e2 has a convex shape toward the object side. The conditional expression (5) indicates a shaping factor of the second lens element e2. When the conditional expressions (4) and (5) are satisfied, the second lens element e2 is a meniscus lens having a convex shape.

In the image forming optical system of the positive-lead type, when a cemented surface of the cemented lens which is disposed on the image side of an aperture is let to be a convex shape toward the object side, an angle of incidence of light rays incident on the cemented surface becomes small. Therefore, it is possible to suppress the generation of the spherical aberration and the coma aberration. Moreover, since a manufacturing-error sensitivity of a coefficient of spherical aberration and a coefficient of coma aberration becomes small, the manufacturing becomes easy.

When an upper limit in the conditional expression (5) is surpassed, a radius of curvature of the surface on the object side of the second lens element e2 becomes excessively small. Therefore, an angle of incidence of light rays incident on the cemented surface becomes substantial, and correction of the spherical aberration and the coma aberration becomes difficult. Moreover, when the upper limit in the conditional expression (5) is surpassed, since on-axis lens thickness increases, an uneven thickness ratio (on-axis lens thickness/edge thickness) becomes substantial, and manufacturing becomes difficult. Whereas, when a lower limit in the conditional expression (5) is surpassed, since the second lens element e2 is a positive lens, it means that the second lens element e2 becomes a biconvex lens. Therefore, Rr2 becomes Rr2<0. Moreover, as the cemented surface becomes a concave surface toward the object side, an angle of incidence of light rays incident on the cemented surface becomes substantial. As a result, correction of the spherical aberration and the coma aberration becomes difficult. Moreover, since the manufacturing-error sensitivity of the coefficient of spherical aberration and the coefficient of coma aberration becomes substantial, the manufacturing becomes difficult.

Moreover, in the image forming optical system of this embodiment, it is preferable that the second lens element e2 is made of resin. It is more preferable that this resin is an energy curable resin. Furthermore, it is preferable that this resin is an ultraviolet curable resin.

By forming the second lens element e2 in such manner, it is possible to reduce a thickness of the lens elements while maintaining various aberrations to be favorable. Moreover, since it is possible to mold by adjusting a thickness of the resin, it is possible to reduce a tolerance of on-axis lens thickness.

Moreover, it is preferable that an electronic image pickup apparatus of this embodiment is let to be an electronic image pickup apparatus which includes the abovementioned image forming optical system and an electronic image pickup element. In the abovementioned image forming optical system, it is possible to reduce the overall length of the optical system and a thickness when collapsed, without deteriorating the chromatic aberration etc. Therefore, when such image forming optical system is used in the electronic image pickup apparatus, it is possible to achieve a thinned electronic image pickup apparatus while achieving an image of high quality.

Embodiments

Exemplary embodiments of the image forming optical system and an electronic image pickup apparatus according to the present invention will be described below in detail by referring to the accompanying diagrams. However, the present invention is not restricted to the embodiments described below.

Figure 1B:
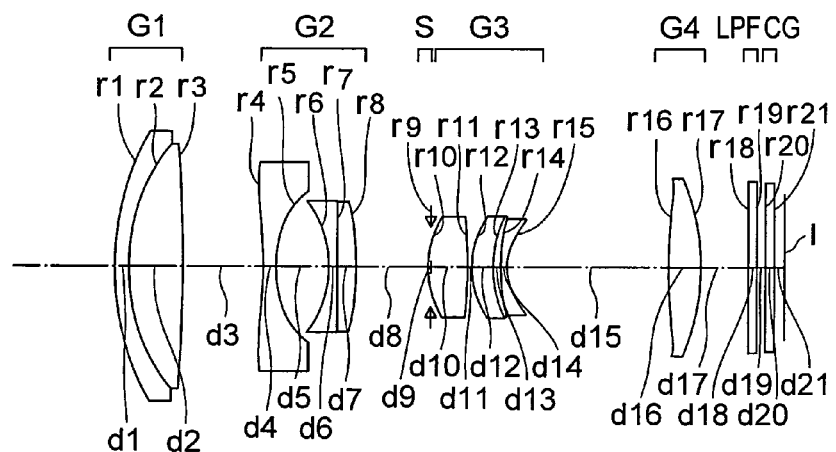
Figure 1C:
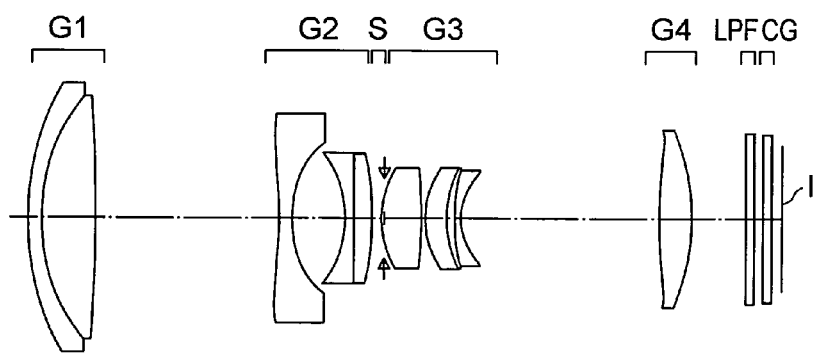

A zoom lens system according to a first embodiment of the present invention will be described below. FIG. 1A, FIG. 1B, and FIG. 1C are cross-sectional views along an optical axis showing an optical arrangement at a time of infinite object point focusing of a zoom lens system according to the first embodiment of the present invention, where, FIG. 1A shows a state at a wide angle end, FIG. 1B shows an intermediate state, and FIG. 1C shows a state at a telephoto end.

Figure 2A:
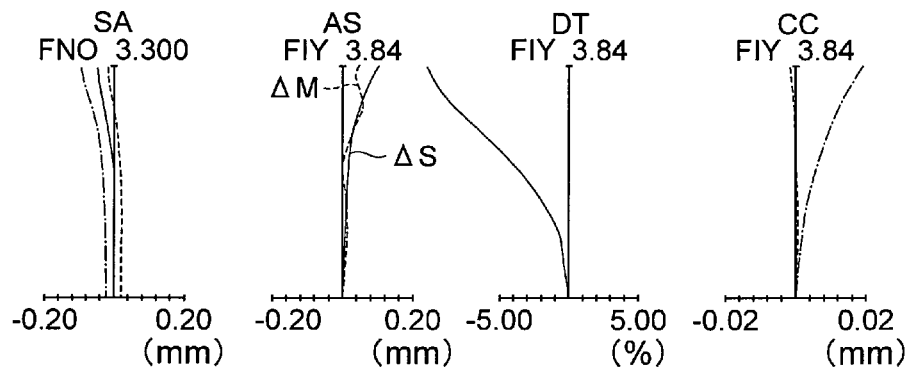
FIG. 2A, FIG. 2B, and FIG. 2C are diagrams showing a spherical aberration, an astigmatism, a distortion, and a chromatic aberration of magnification at the time of infinite object point focusing of the zoom lens system according to the first embodiment, where.
Figure 2B:
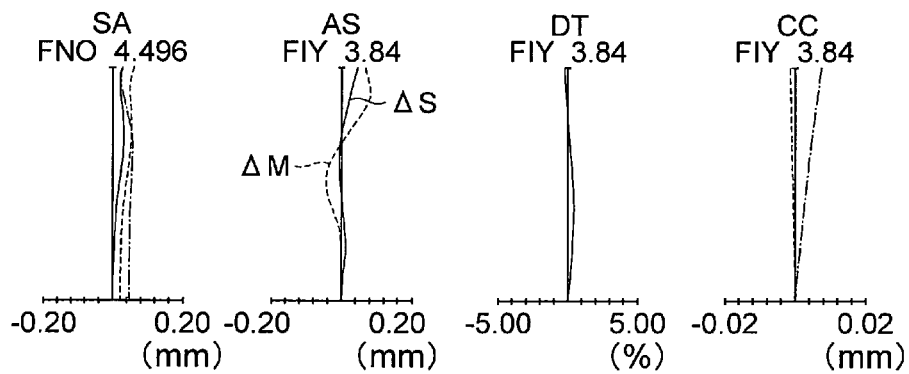
Figure 2C:
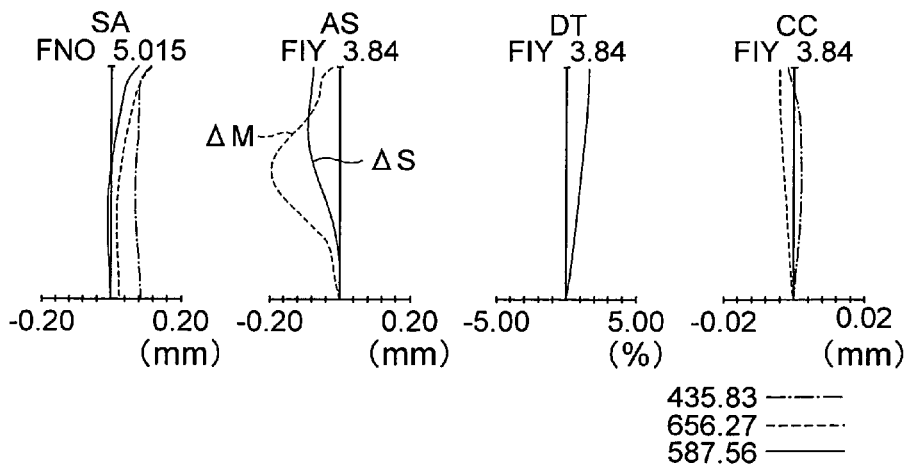

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens system according to the first embodiment, where, FIG. 2A shows a state at a wide angle end, FIG. 2B shows an intermediate state, and FIG. 2C shows a state at a telephoto end. Moreover, FIY denotes an image height. Reference numerals in the aberration diagrams are same also in the embodiments which will be described later.

The zoom lens system in the first embodiment, as shown in FIG. 1A, FIG. 1B, and FIG. 1C, in order from an object side, includes a first lens unit G1 having a positive refracting power, a second lens unit G2 having a negative refracting power, an aperture stop S, a third lens unit G3 having a positive refracting power, and a fourth lens unit G4 having a positive refracting power. In all the following embodiments, in lens cross-sectional views, LPF denotes a low pass filter, CG denotes a cover glass, and I denotes an image pickup surface of the electronic image pickup element.

The first lens unit G1, in order from the object side, includes a cemented lens of a negative meniscus lens L1 having a convex surface directed toward the object side and biconvex positive lens L2, and has a positive refracting power as a whole.

The second lens unit G2, in order form the object side, includes a biconcave negative lens L3 and a cemented lens of a biconcave negative lens L4 and a biconvex positive lens L5, and has a negative refracting power as a whole.

The third lens unit G3, in order from the object side, includes a biconvex positive lens L6, and a cemented lens of a positive meniscus lens L7 having a convex surface directed toward the object side, a positive meniscus lens L8 having a convex surface directed toward the object side, and a negative meniscus lens L9 having a convex surface directed toward the object side, and has a positive refracting power as a whole.

The fourth lens unit G4 includes a biconvex positive lens L10, and has a positive refracting power as a whole.

At the time of zooming from the wide angle end to the telephoto end, the first lens unit G1 moves toward the object side. The second lens unit G2, after moving toward the object side, moves toward the image side. The third lens unit G3 moves toward the object side. The fourth lens unit G4, after moving toward the image side, moves toward the object side.

An aspheric surface is provided to six surfaces namely, a surface on the image side of the biconvex positive lens L2 in the first lens unit G1, both surfaces of the biconcave negative lens L3 on the object side in the second lens unit G2, both surfaces of the biconvex positive lens L6 in the third lens unit G3, and a surface on the object side of the biconvex positive lens L10 in the fourth lens unit G4.

Figure 3A:
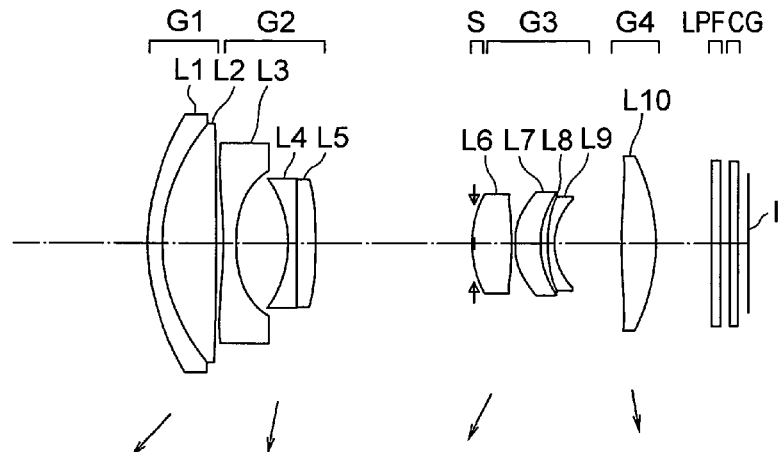
FIG. 3A, FIG. 3B, and FIG. 3C are lens cross-sectional views at the time of infinite object point focusing according to a second embodiment of the zoom lens system of the present invention, where.
Figure 3B:
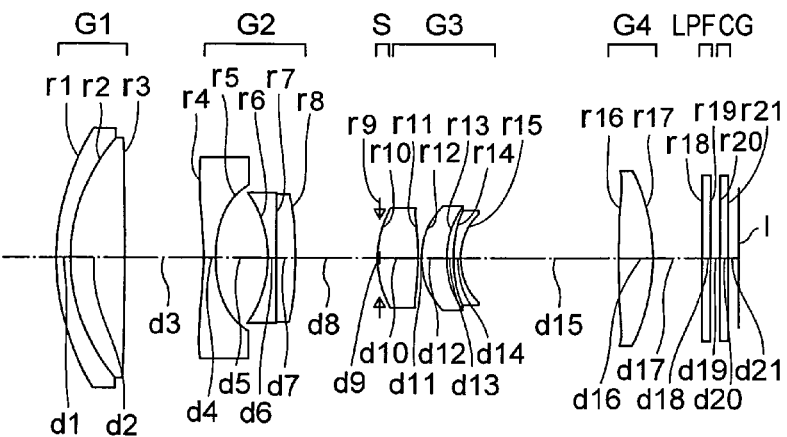
Figure 3C:
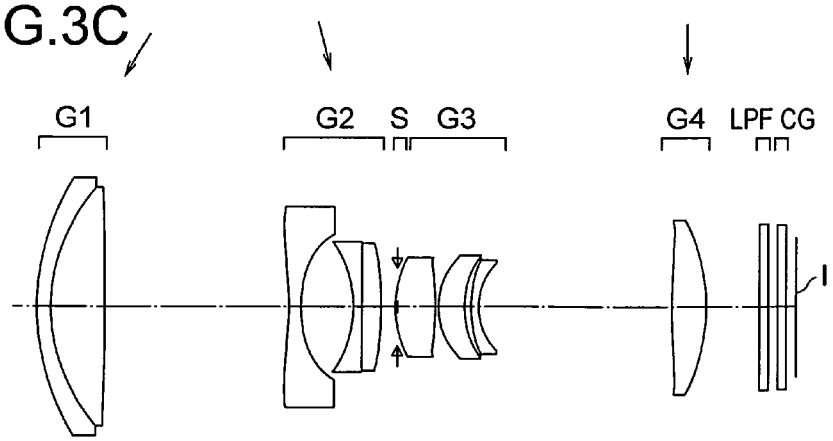

Next, a zoom lens system according to a second embodiment of the present invention will be described below. FIG. 3A, FIG. 3B, and FIG. 3C are lens cross-sectional views along an optical axis showing an optical arrangement at the time of infinite object point focusing according to the second embodiment of the zoom lens system of the present invention, where, FIG. 3A shows a cross-sectional view of a state at a wide angle end, FIG. 3B shows a cross-sectional view of an intermediate state, and FIG. 3C shows a cross-sectional view of a state at a telephoto end.

Figure 4A:
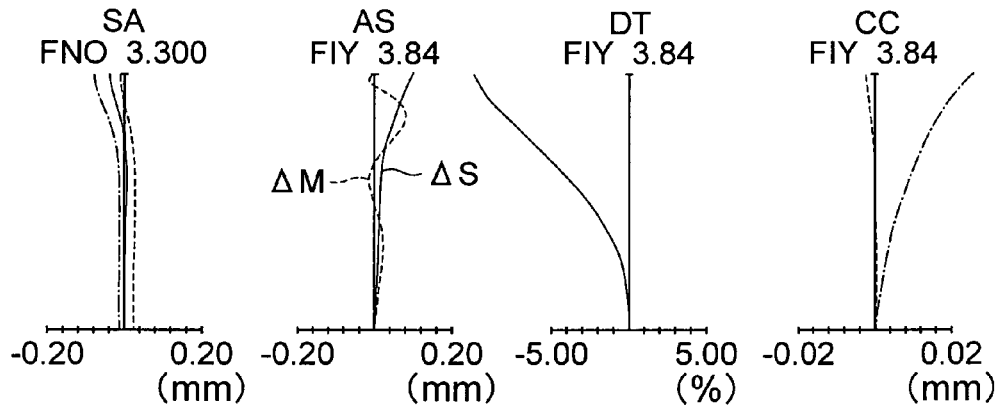
FIG. 4A, FIG. 4B, and FIG. 4C are diagrams showing a spherical aberration, an astigmatism, a distortion, and a chromatic aberration of magnification at the time of infinite object point focusing of the zoom lens system according to the second embodiment, where.
Figure 4B:
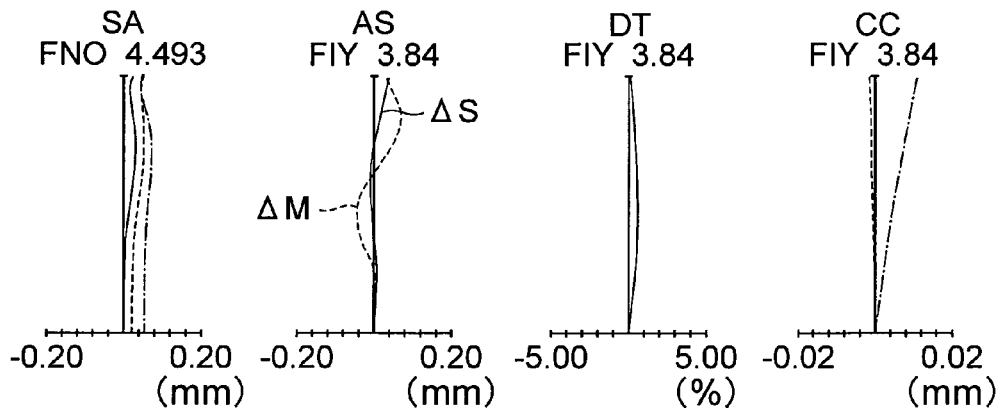
Figure 4C:
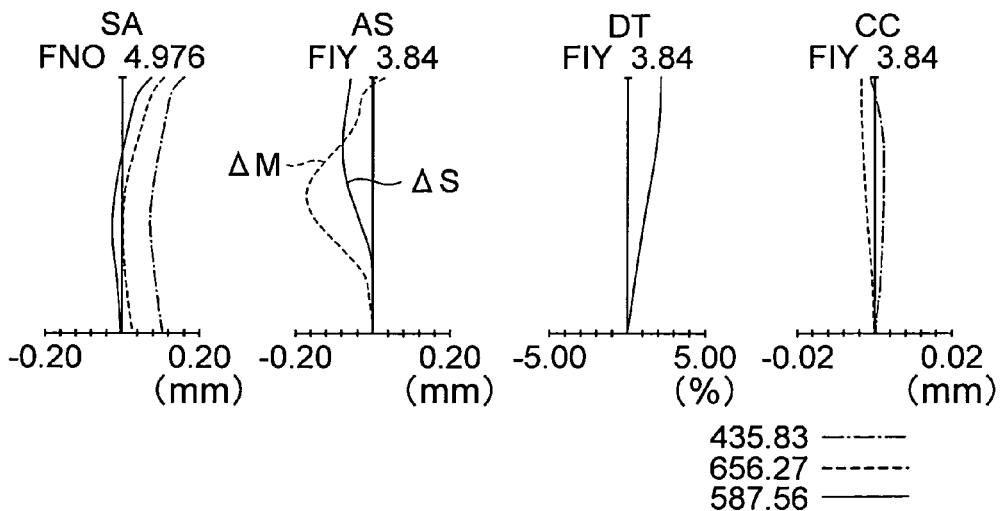

FIG. 4A, FIG. 4B, and FIG. 4C are diagrams showing a spherical aberration, an astigmatism, a distortion, and a chromatic aberration of magnification at the time of infinite object point focusing of the zoom lens system according to the second embodiment, where, FIG. 4A shows a state at a wide angle end, FIG. 4B shows an intermediate state, and FIG. 4C shows a state at a telephoto end.

The zoom lens system in the second embodiment, as shown in FIG. 3A, FIG. 3B, and FIG. 3C, in order from an object side, includes a first lens unit G1 having a positive refracting power, a second lens unit G2 having a negative refracting power, an aperture stop S, a third lens unit G3 having a positive refracting power, and a fourth lens unit G4 having a positive refracting power.

The first lens unit G1, in order from the object side, includes a cemented lens of a negative meniscus lens L1 having a convex surface directed toward the object side and a biconvex positive lens L2, and has a positive refracting power as a whole.

The second lens unit G2, in order from the object side, includes a biconcave negative lens L3, and a cemented lens of a biconcave negative lens L4 and a biconvex positive lens L5, and has a negative refracting power as a whole.

The third lens unit G3, in order from the object side, includes a biconvex positive lens L6, and a cemented lens of a positive meniscus lens L7 having a convex surface directed toward the object side, a positive meniscus lens L8 having a convex surface directed toward the object side, and a negative meniscus lens L9 having a convex surface directed toward the object side, and has a positive refracting power as a whole.

The fourth lens unit G4 includes a biconvex positive lens L10, and has a positive refracting power as a whole.

At the time of zooming from the wide angle end to the telephoto end, the first lens unit G1 moves toward the object side. The second lens unit G2, after moving toward the object side, moves toward the image side. The third lens unit G3 moves toward the object side. The fourth lens unit G4, after moving toward the image side, moves toward the object side.

An aspheric surface is provided to six surfaces namely, a surface on the image side of the biconvex positive lens L2 in the first lens unit G1, both surfaces of the biconcave negative lens L3 on the object side in the second lens unit G2, both surfaces of the biconvex positive lens L6 in the third lens unit G3, and a surface on the object side of the biconvex positive lens L10 in the fourth lens unit G4.

Figure 5A:
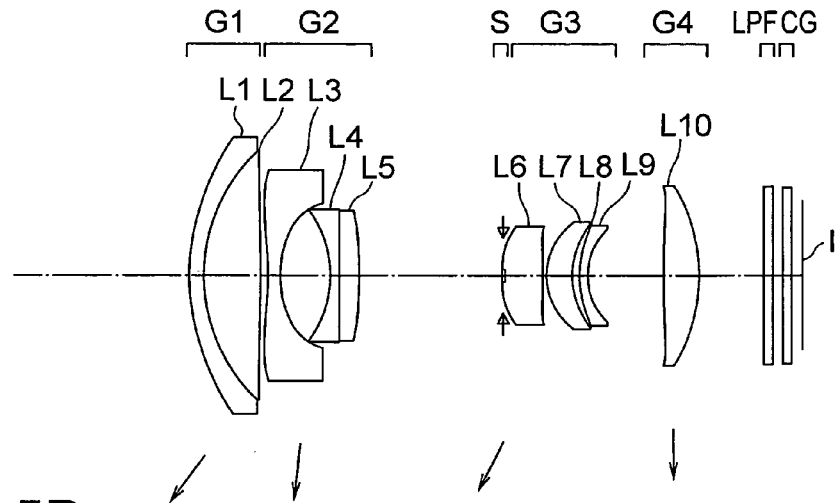
FIG. 5A, FIG. 5B, and FIG. 5C are lens cross-sectional views at the time of infinite object point focusing according to a third embodiment of the zoom lens system of the present invention, where.
Figure 5B:
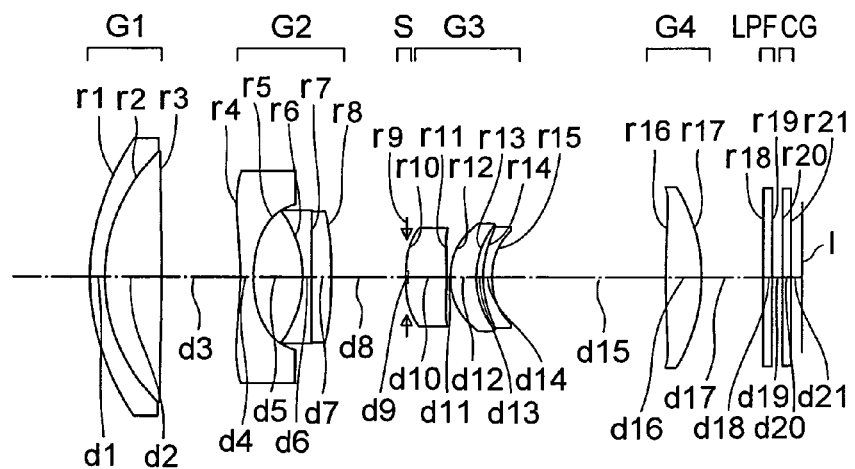
Figure 5C:
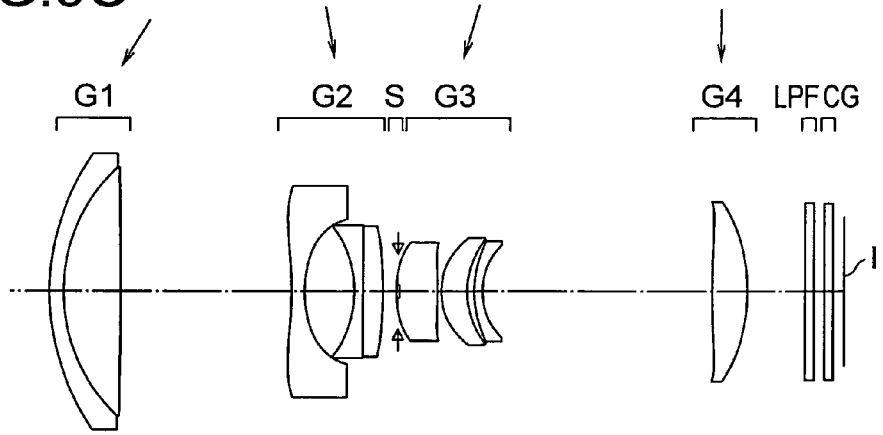

Next, a zoom lens system according to a third embodiment of the present invention will be described below. FIG. 5A, FIG. 5B, FIG. 5C are lens cross-sectional views along an optical axis showing an optical arrangement at the time of infinite object point focusing of the zoom lens system according to the third embodiment of the present invention, where, FIG. 5A shows a cross-sectional view of a state at a wide angle end, FIG. 5B shows a cross-sectional view of an intermediate state, and FIG. 5C shows a cross-sectional view of a state at a telephoto end.

Figure 6A:
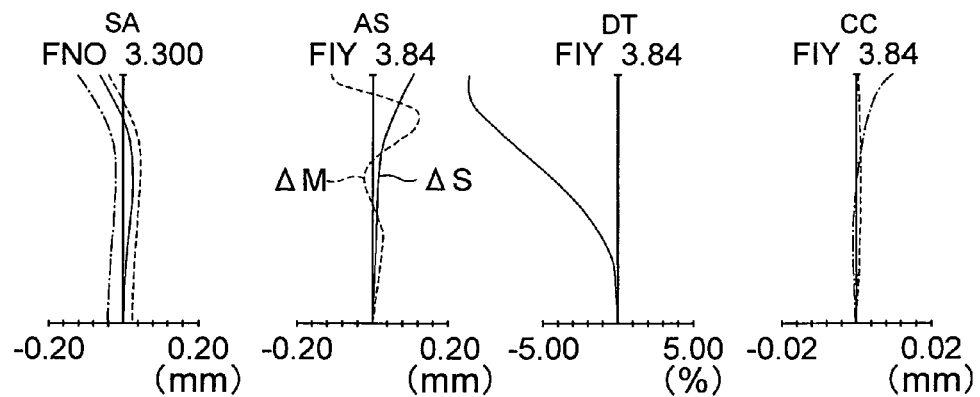
FIG. 6A, FIG. 6B, and FIG. 6C are diagrams showing a spherical aberration, an astigmatism, a distortion, and a chromatic aberration of magnification at the time of infinite object point focusing of the zoom lens system according to the third embodiment, where.
Figure 6B:
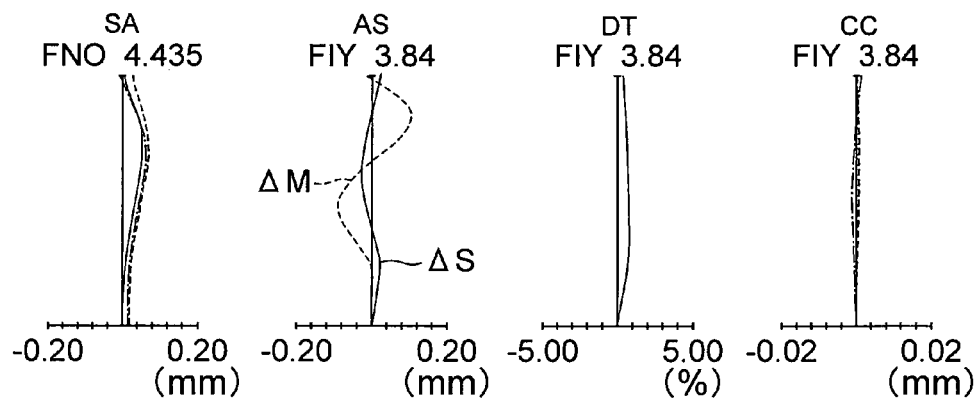
Figure 6C:
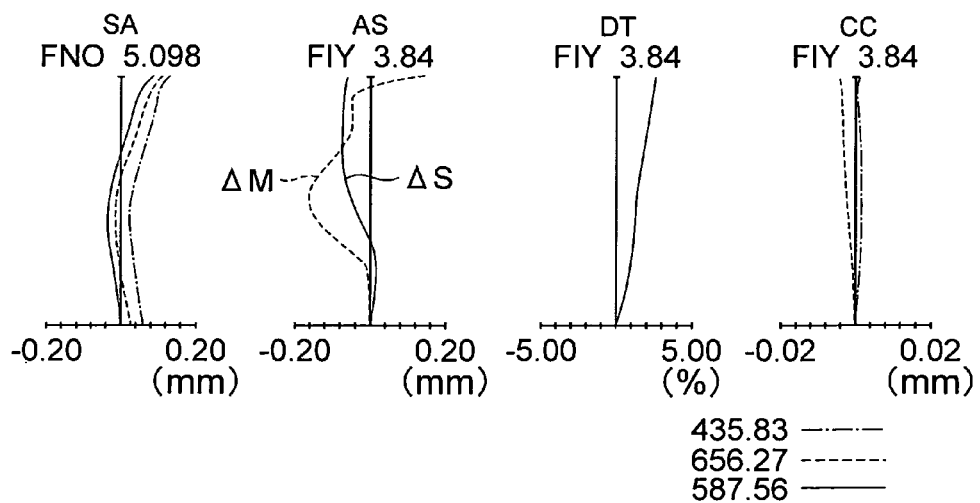

FIG. 6A, FIG. 6B, and FIG. 6C are diagrams showing a spherical aberration, an astigmatism, a distortion, and a chromatic aberration of magnification at the time of infinite object point focusing of the zoom lens system according to the third embodiment, where, FIG. 6A shows a state at a wide angle end, FIG. 6B shows an intermediate state, and FIG. 6C shows a state at a telephoto end.

The zoom lens system in the third embodiment, as shown in FIG. 5A, FIG. 5B, and FIG. 5C, includes a first lens unit G1 having a positive refracting power, a second lens unit G2 having a negative refracting power, an aperture stop S, a third lens unit G3 having a positive refracting power, and a fourth lens unit G4 having a positive refracting power.

The first lens unit G1, in order from the object side, includes a cemented lens of a negative meniscus lens L1 having a convex surface directed toward the object side and a biconvex positive lens L2, and has a positive refracting power as a whole.

The second lens unit G2, in order from the object side, includes a biconcave negative lens L3, and a cemented lens of a biconcave negative lens L4 and a biconvex positive lens L5, and has a negative refracting power as a whole.

The third lens unit G3, in order from the object side, includes a biconvex positive lens L6, and a cemented lens of a positive meniscus lens L7 having a convex surface directed toward the object side, a positive meniscus lens L8 having a convex surface directed toward the object side, and a negative meniscus lens L9 having a convex surface directed toward the object side, and has a positive refracting power as a whole.

The fourth lens unit G4 includes a biconvex positive lens L10, and has a positive refracting power as a whole.

At the time of zooming from the wide angle end to the telephoto end, the first lens unit G1 moves toward the object side. The second lens unit G2, after moving toward the object side, moves toward the image side. The third lens unit G3 moves toward the object side. The fourth lens unit G4 moves toward the image side.

An aspheric surface is provided to six surfaces namely, a surface on the image side of the biconvex positive lens L2 in the first lens unit G1, both surfaces of the biconcave negative lens L3 on the object side in the second lens unit G2, both surfaces of the biconvex positive lens L6 in the third lens unit G3, and a surface on the object side of the biconvex positive lens L10 in the fourth lens unit G4.

Figure 7A:
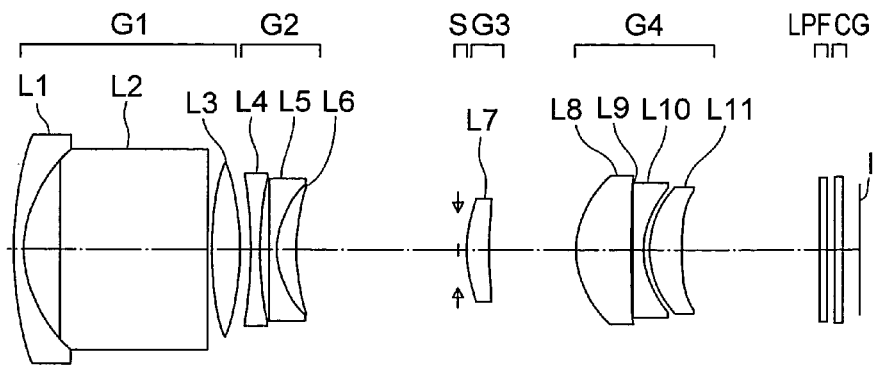
FIG. 7A, FIG. 7B, and FIG. 7C are lens cross-sectional views at the time of infinite object point focusing according to a fourth embodiment of the zoom lens system of the present invention, where.
Figure 7B:
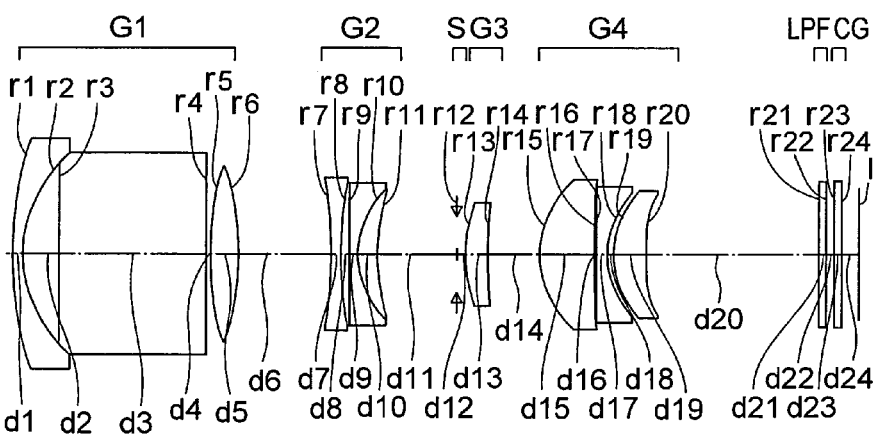
Figure 7C:
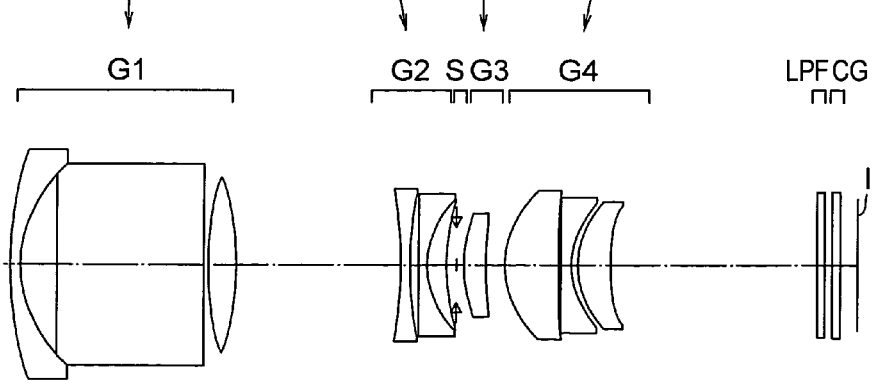

Next, a zoom lens system according to a fourth embodiment of the present invention will be described below. FIG. 7A, FIG. 7B, and FIG. 7c are lens cross-sectional views along an optical axis showing an optical arrangement at the time of infinite object point focusing of the zoom lens system according to the fourth embodiment of the present invention, where, FIG. 7A shows a cross-sectional view of a state at a wide angle end, FIG. 7B shows a cross-sectional view of an intermediate state, and FIG. 7C shows a cross-sectional view of a state at a telephoto end.

Figure 8A:
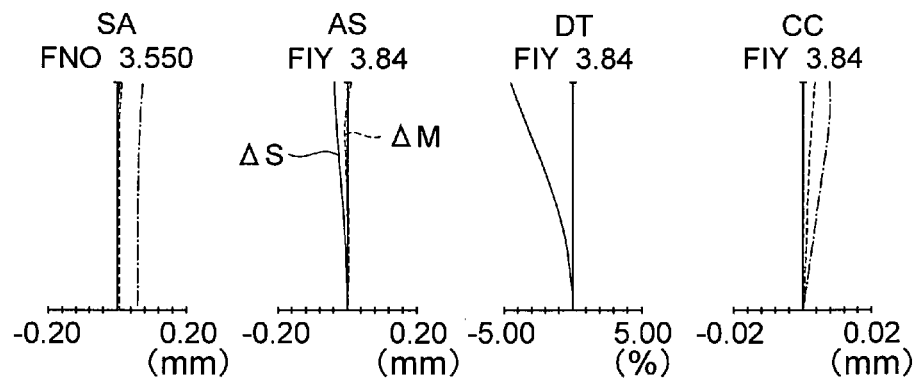
FIG. 8A, FIG. 8B, and FIG. 8C are diagrams showing a spherical aberration, an astigmatism, a distortion, and a chromatic aberration of magnification at the time of infinite object point focusing of the zoom lens system according to the fourth embodiment, where.
Figure 8B:
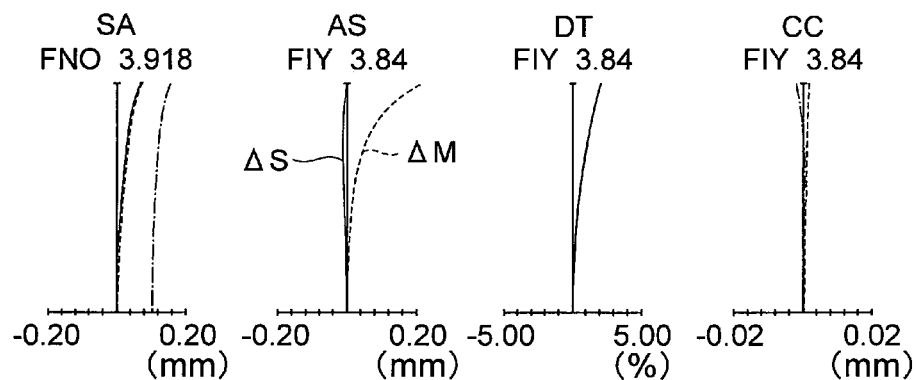
Figure 8C:
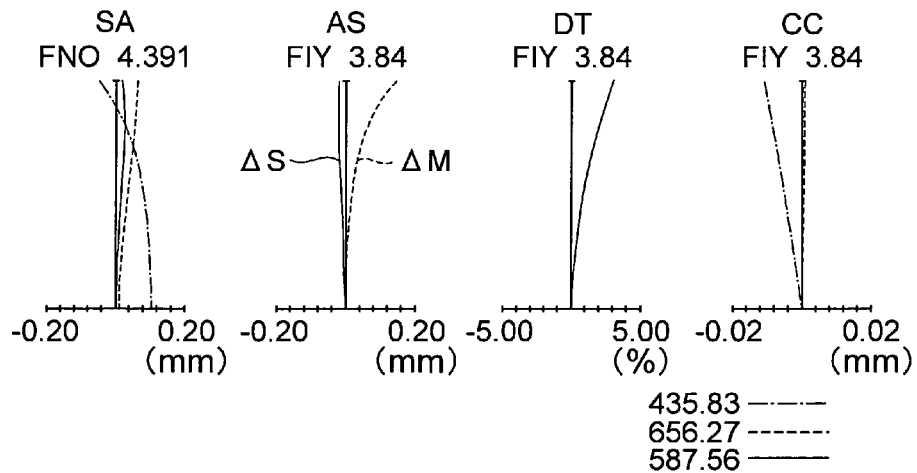

FIG. 8A, FIG. 8B, and FIG. 8C are diagrams showing a spherical aberration, an astigmatism, a distortion, and a chromatic aberration of magnification at the time of infinite object point focusing of the zoom lens system according to the fourth embodiment, where, FIG. 8A shows a state at a wide angle end, FIG. 8B shows an intermediate state, and FIG. 8C shows a state at a telephoto end.

The zoom lens system in the fourth embodiment, as shown in FIG. 7A, FIG. 7B, and FIG. 7C, includes a first lens unit G1 having a positive refracting power, a second lens unit G2 having a negative refracting power, an aperture stop S, a third lens unit G3 having a positive refracting power, and a fourth lens unit G4 having a positive refracting power.

The first lens unit G1, in order from the object side, includes a negative meniscus lens L1 having a convex surface directed toward the object side, a prism L2, and a biconvex positive lens L3, and has a positive refracting power as a whole.

The second lens unit G2, in order from the object side, includes a biconcave negative lens L4, and a cemented lens of a negative meniscus lens L5 having a convex surface directed toward the object side and a positive meniscus lens L6 having a convex surface directed toward the object side, and has a negative refracting power as a whole.

The third lens unit G3 includes a positive meniscus lens L7 having a convex surface directed toward the object side, and has a positive refracting power as a whole.

The fourth lens unit G4 includes a cemented lens of a positive meniscus lens L8 having a convex surface directed toward the object side, a positive meniscus lens L9 having a convex surface directed toward the object side, and a negative meniscus lens L10 having a convex surface directed toward the object side, and a positive meniscus lens L11 having a convex surface directed toward the object side, and has a positive refracting power as a whole.

At the time of zooming from the wide angle end to the telephoto end, the first lens unit G1 does not move. The second lens unit G2 moves toward the image side. The third lens unit G3 does not move. The fourth lens unit G4 moves toward the object side.

An aspheric surface is provided to three surfaces namely, a surface on the object side of the positive meniscus lens L7 in the third lens unit G3 and both surfaces of the positive meniscus lens L11 in the fourth lens unit G4.

Figure 9A:
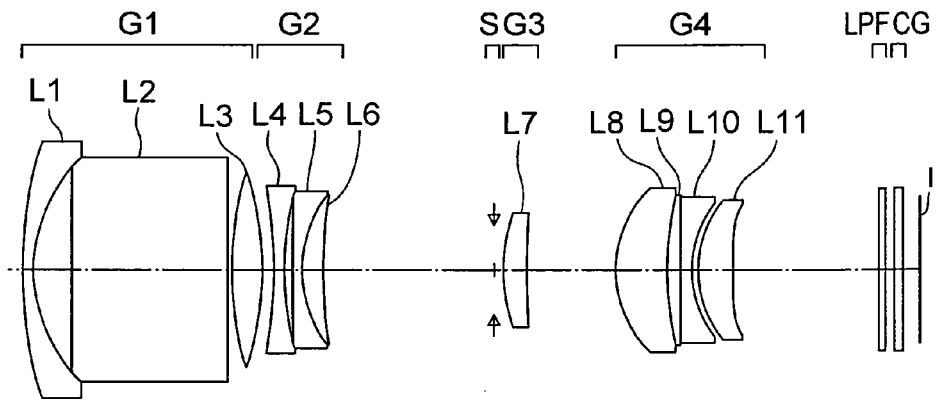
FIG. 9A, FIG. 9B, and FIG. 9C are lens cross-sectional views at the time of infinite object point focusing according to a fifth embodiment of the zoom lens system of the present invention, where.
Figure 9B:
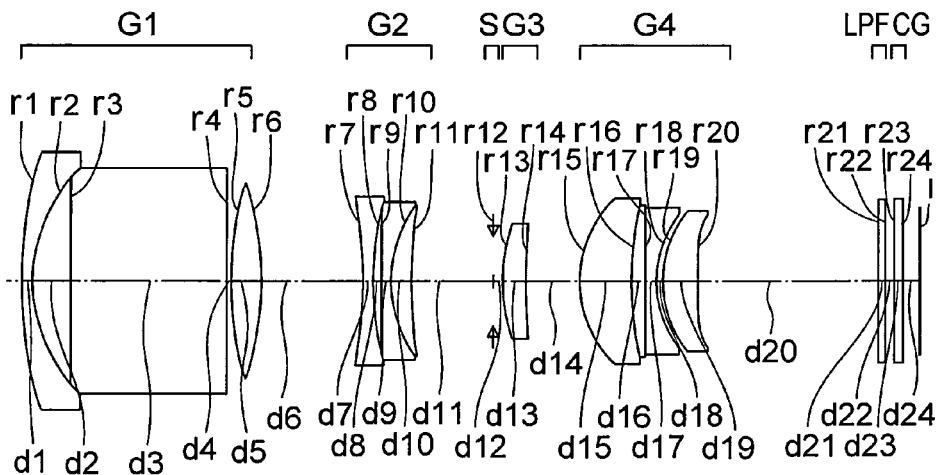
Figure 9C:
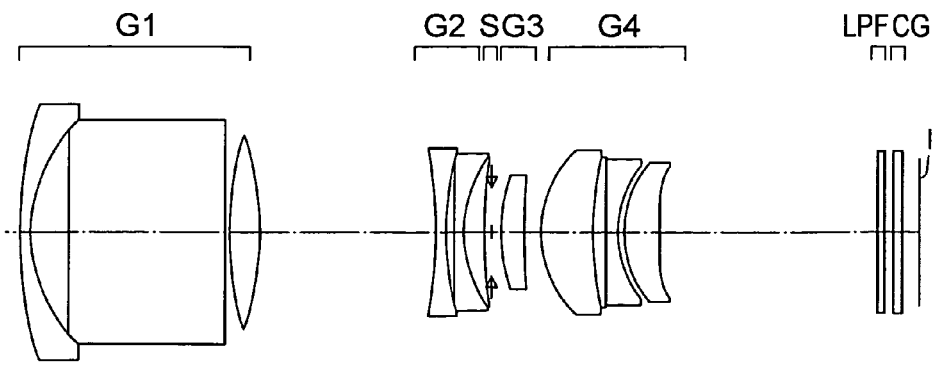

Next, a zoom lens system according to a fifth embodiment of the present invention will be described below. FIG. 9A, FIG. 9B, and FIG. 9C are lens cross-sectional views along an optical axis showing an optical arrangement at the time of infinite object point focusing of the zoom lens system according to the fifth embodiment of the present invention, where, FIG. 9A shows a cross-sectional view of a state at a wide angle end, FIG. 9B shows a cross-sectional view of an intermediate state, and FIG. 9C shows a cross-sectional view of a state at a telephoto end.

Figure 10A:
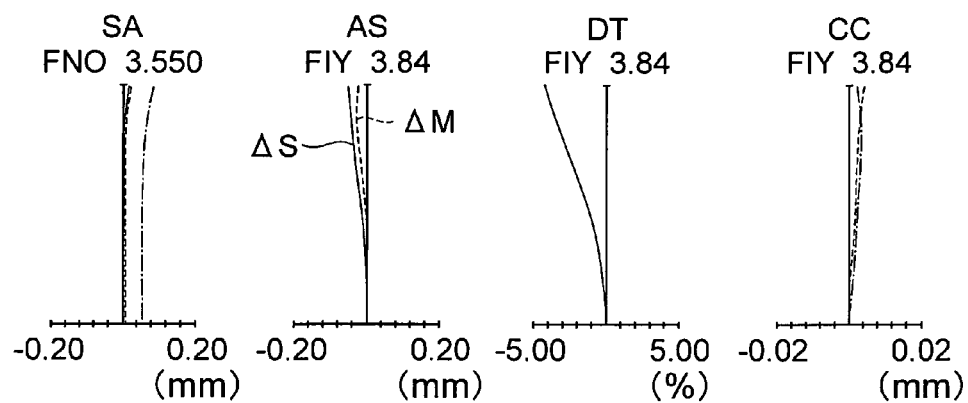
FIG. 10A, FIG. 10B, and FIG. 10C are diagrams showing a spherical aberration, an astigmatism, a distortion, and a chromatic aberration of magnification at the time of infinite object point focusing of the zoom lens system according to the firth embodiment, where.
Figure 10B:
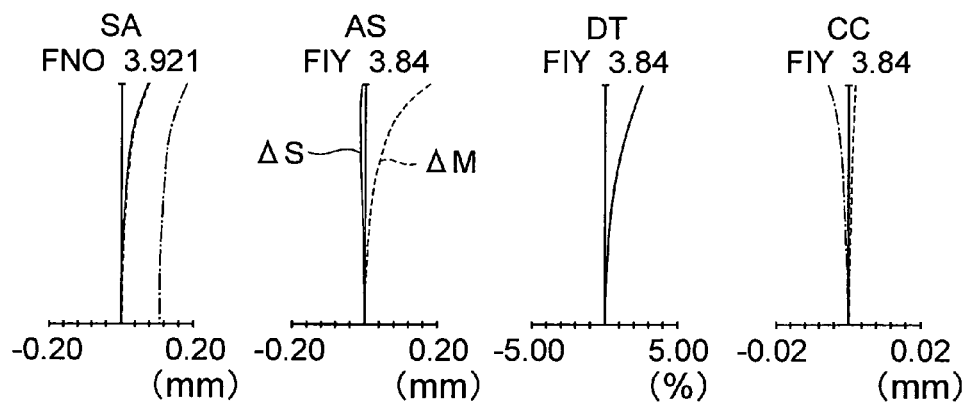
Figure 10C:
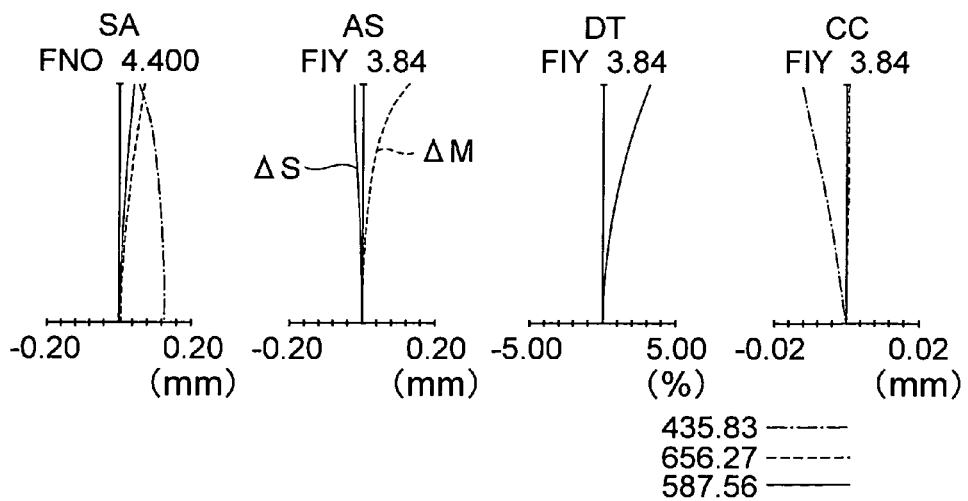

FIG. 10A, FIG. 10B, and FIG. 10C are diagrams showing a spherical aberration, an astigmatism, a distortion, and a chromatic aberration of magnification at the time of infinite object point focusing of the zoom lens system according to the fifth embodiment, where, FIG. 10A shows a state at a wide angle end, FIG. 10B shows an intermediate state, and FIG. 10C shows a state at a telephoto end.

The zoom lens system in the fifth embodiment, as shown in FIG. 9A, FIG. 9B, and FIG. 9C, includes a first lens unit G1 having a positive refracting power, a second lens unit G2 having a negative refracting power, an aperture stop S, a third lens unit G3 having a positive refracting power, and a fourth lens unit G4 having a positive refracting power.

The first lens unit G1, in order from the object side, includes a negative meniscus lens L1 having a convex surface directed toward the object side, a prism L2, and a biconvex positive lens L3, and has a positive refracting power as a whole.

The second lens unit G2, in order from the object side, includes a biconcave negative lens L4, and a cemented lens of a biconcave negative lens L5 and a positive meniscus lens L6 having a convex surface directed toward the object side, and has a negative refracting power as a whole.

The third lens unit G3 includes a positive meniscus lens L7 having a convex surface directed toward the object side, and has a positive refracting power as a whole.

The fourth lens unit G4 includes a positive meniscus lens L8 having a convex surface directed toward the object side, a positive meniscus lens L9 having a convex surface directed toward the object side, a negative meniscus lens L10 having a convex surface directed toward the object side, and a positive meniscus lens L11 having a convex surface directed toward the object side, and has a positive refracting power as a whole.

At the time of zooming from the wide angle end to the telephoto end, the first lens unit G1 does not move. The second lens unit G2 moves toward the image side. The third lens unit G3 does not move. The fourth lens unit G4 moves toward the object side.

An aspheric surface is provided to three surfaces namely, a surface on the object side of the positive meniscus lens L7 in the third lens unit G3, and both surfaces of the positive meniscus lens L10 in the fourth lens unit G4.

Numerical data of each embodiment described above is shown below. Apart from symbols described above, f denotes a focal length of the entire zoom lens system, $F_{NO}$ denotes an F number, ω denotes a half angle of field, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens. Further, * denotes an aspheric data, ER denotes an effective radius, S denotes a stop.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4 y^4+A_6 y^6+A_8 y^8+A_{10} y^{10} \quad (I)$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'E–n' (where, n is an integral number) indicates '$10^{-n}$'.

EXAMPLE 1 unit mm

Surface data

| Surface no. | r | d | nd | vd | ER |
|---|---|---|---|---|---|
| object plane | ∞ | ∞ | | | |
| 1 | 15.2504 | 0.8000 | 1.84666 | 23.78 | 7.002 |
| 2 | 10.8388 | 3.0700 | 1.58233 | 59.30 | 6.317 |
| 3* | −88.3149 | Variable | | | 6.000 |
| 4* | −16.6948 | 0.7000 | 1.52542 | 55.78 | 5.302 |
| 5* | 6.9880 | 3.0592 | | | 3.688 |
| 6 | −5.8768 | 0.4100 | 1.61772 | 49.81 | 3.134 |
| 7 | 663.1573 | 1.1112 | 1.92286 | 18.90 | 3.099 |
| 8 | −16.7030 | Variable | | | 3.080 |
| 9 (S) | ∞ | −0.1000 | | | 2.037 |
| 10* | 5.7757 | 2.2435 | 1.58233 | 59.30 | 2.170 |
| 11* | −13.3999 | 0.2000 | | | 2.282 |
| 12 | 4.6926 | 1.2413 | 1.48749 | 70.23 | 2.336 |
| 13 | 5.6412 | 0.4340 | 1.63387 | 23.38 | 2.181 |
| 14 | 9.5034 | 0.4000 | 1.92286 | 18.90 | 2.141 |
| 15 | 3.4881 | Variable | | | 2.000 |
| 16* | 47.4492 | 1.9000 | 1.53113 | 55.80 | 4.450 |
| 17 | −12.1485 | Variable | | | 4.356 |
| 18 | ∞ | 0.5000 | 1.51633 | 64.14 | 4.223 |

-continued unit mm

| | | | | | |
|---|---|---|---|---|---|
| 19 | ∞ | 0.5000 | | | 4.211 |
| 20 | ∞ | 0.5000 | 1.51633 | 64.14 | 4.194 |
| 21 | ∞ | 0.6000 | | | 4.182 |
| Image plane (Light receiving surface) | ∞ | | | | |

Aspherical surface data

3rd surface

K = −8.3595, A4 = 6.7770E−06, A6 = 4.8987E−07, A8 = −1.1193E−08, A10 = 8.2773E−11

4th surface

K = −71.6612, A4 = −3.4631E−04, A6 = 4.1685E−05, A8 = −1.0511E−06, A10 = 9.8078E−09

5th surface

K = 0.1289, A4 = 9.9969E−04, A6 = −1.0694E−04, A8 = 1.1147E−05, A10 = −2.1862E−07

10th surface

K = −4.1034, A4 = 2.5993E−03, A6 = −1.2324E−04, A8 = 2.5923E−05, A10 = −1.5674E−06

11th surface

K = 5.0838, A4 = 1.6134E−03, A6 = −3.4491E−05, A8 = 2.3294E−05, A10 = −1.3404E−06

16th surface

K = −1639.3391, A4 = 1.1542E−03, A6 = −1.0583E−04, A8 = 6.0609E−06, A10 = −1.3707E−07

Zoom data
Zoom ratio 4.77

| | WE | ST | TE |
|---|---|---|---|
| f (mm) | 6.5006 | 14.0234 | 31.0300 |
| Fno. | 3.3000 | 4.4958 | 5.0148 |
| 2ω (°) | 66.5740 | 30.7090 | 13.8817 |
| IH | 3.8400 | 3.8400 | 3.8400 |
| Lens total length | 32.9856 | 37.9793 | 42.6111 |
| BF | 5.0138 | 4.6275 | 4.7736 |
| Entrance pupil position | 10.8190 | 19.2829 | 40.9368 |
| Exit pupil position | −15.8667 | −39.3396 | −65.6074 |
| Front side principal point position | 14.6563 | 28.3074 | 57.2907 |
| Back side principal point position | −5.9059 | −13.4228 | −30.4274 |
| d3 | 0.41000 | 4.53037 | 10.42393 |
| d8 | 8.25545 | 4.24283 | 0.71425 |
| d15 | 3.83726 | 9.10952 | 11.23030 |
| d17 | 3.25434 | 2.86803 | 3.01406 |

Single lens data

| Lens no. | Lens surface | f |
|---|---|---|
| 1 | 1-2 | −48.2677 |
| 2 | 2-3 | 16.7693 |
| 3 | 4-5 | −9.2810 |
| 4 | 6-7 | −9.4279 |
| 5 | 7-8 | 17.6684 |
| 6 | 10-11 | 7.2427 |
| 7 | 12-13 | 40.0621 |
| 8 | 13-14 | 20.9840 |
| 9 | 14-15 | −6.1681 |
| 10 | 16-17 | 18.4142 |

Zoom lens unit data

| Unit | Lens surface | Focal length | Lens structure length | Front side principal point position | Back side principal point position |
|---|---|---|---|---|---|
| 1 | 1 | 26.49297 | 3.87000 | 0.13829 | −2.26744 |
| 2 | 4 | −6.14638 | 5.28039 | 0.91209 | −3.38485 |
| 3 | 9 | 8.35405 | 4.41871 | −2.76909 | −3.97186 |
| 4 | 16 | 18.41418 | 1.90000 | 0.99901 | −0.25578 |

| Unit | Lens surface | Magnification (WE) | Magnification (ST) | Magnification (TE) |
|---|---|---|---|---|
| 1 | 1-3 | 0. | 0. | 0. |
| 2 | 4-8 | −0.36679 | −0.48639 | −0.91150 |
| 3 | 9-15 | −0.93676 | −1.48109 | −1.76814 |
| 4 | 16-17 | 0.71412 | 0.73478 | 0.72674 |

EXAMPLE 2 unit mm

Surface data

| Surface no. | r | d | nd | vd | ER |
|---|---|---|---|---|---|
| object plane | ∞ | ∞ | | | |
| 1 | 14.2647 | 0.8000 | 1.84666 | 23.78 | 6.836 |
| 2 | 10.2219 | 3.0700 | 1.58233 | 59.30 | 6.280 |
| 3* | −161.1296 | Variable | | | 6.000 |
| 4* | −15.1051 | 0.7000 | 1.52542 | 55.78 | 5.196 |
| 5* | 7.4083 | 2.9508 | | | 3.648 |
| 6 | −6.0769 | 0.4100 | 1.61772 | 49.81 | 3.148 |
| 7 | 500.8990 | 1.1588 | 1.92286 | 18.90 | 3.104 |
| 8 | −16.9559 | Variable | | | 3.080 |
| 9 (S) | ∞ | −0.1000 | | | 2.052 |
| 10* | 6.3877 | 2.2469 | 1.58233 | 59.30 | 2.170 |
| 11* | −14.9638 | 0.2000 | | | 2.291 |
| 12 | 4.1096 | 1.4407 | 1.48749 | 70.23 | 2.389 |
| 13 | 4.6960 | 0.4076 | 1.63387 | 23.38 | 2.185 |
| 14 | 7.0395 | 0.4000 | 2.14352 | 17.77 | 2.144 |
| 15 | 3.4743 | Variable | | | 1.988 |
| 16* | 60.0684 | 1.9000 | 1.53113 | 55.80 | 4.450 |
| 17 | −10.8140 | Variable | | | 4.326 |
| 18 | ∞ | 0.5000 | 1.51633 | 64.14 | 4.232 |
| 19 | ∞ | 0.5000 | | | 4.224 |
| 20 | ∞ | 0.5000 | 1.51633 | 64.14 | 4.212 |
| 21 | ∞ | 0.6000 | | | 4.204 |
| Image plane (Light receiving surface) | ∞ | | | | |

Aspherical surface data

3rd surface

K = −8.3595, A4 = 5.9814E−06, A6 = 4.9900E−07, A8 = −1.1886E−08, A10 = 9.1830E−11

4th surface

K = −71.6612, A4 = 1.2045E−06, A6 = 1.3605E−05, A8 = −7.6420E−08, A10 = −2.4071E−09

5th surface

K = 0.1289, A4 = 1.9812E−03, A6 = −1.7716E−04, A8 = 1.2918E−05, A10 = −1.7889E−07

10th surface

K = −4.1034, A4 = 2.3755E−03, A6 = −5.9586E−05, A8 = 2.2516E−05, A10 = −1.2870E−06

11th surface

K = 5.0838, A4 = 1.8011E−03, A6 = 1.1463E−05, A8 = 1.8524E−05, A10 = −5.6828E−07

16th surface

K = −3737.5621, A4 = 8.8071E−04, A6 = −1.0053E−04, A8 = 6.3827E−06, A10 = −1.5565E−07

-continued unit mm

Zoom data (∞)
Zoom ratio 4.77

|  | WE | ST | TE |
|---|---|---|---|
| f (mm) | 6.5107 | 14.0231 | 31.0245 |
| Fno. | 3.3000 | 4.4929 | 4.9756 |
| 2ω (°) | 66.4629 | 30.6040 | 13.8024 |
| IH | 3.8400 | 3.8400 | 3.8400 |
| Lens total length | 33.6814 | 38.3396 | 42.6124 |
| BF | 4.9239 | 4.5446 | 4.7975 |
| Entrance pupil position | 11.1300 | 19.6395 | 41.3834 |
| Exit pupil position | −16.1461 | −42.8409 | −73.5283 |
| Front side principal point position | 15.0153 | 29.0725 | 59.3174 |
| Back side principal point position | −5.9197 | −13.4224 | −30.4212 |
| d3 | 0.41000 | 4.49216 | 10.39507 |
| d8 | 8.93270 | 4.69206 | 0.87485 |
| d15 | 3.83008 | 9.02604 | 10.96032 |
| d17 | 3.16438 | 2.78514 | 3.03798 |

Single lens data

| Lens no. | Lens surface | f |
|---|---|---|
| 1 | 1-2 | −46.8498 |
| 2 | 2-3 | 16.6159 |
| 3 | 4-5 | −9.3599 |
| 4 | 6-7 | −9.7167 |
| 5 | 7-8 | 17.7907 |
| 6 | 10-11 | 7.9973 |
| 7 | 12-13 | 37.3963 |
| 8 | 13-14 | 20.8481 |
| 9 | 14-15 | −6.3810 |
| 10 | 16-17 | 17.4161 |

Zoom lens unit data

| Unit | Lens surface | Focal length | Lens structure length | Front side principal point position | Back side principal point position |
|---|---|---|---|---|---|
| 1 | 1 | 26.70885 | 3.87000 | −0.06801 | −2.45688 |
| 2 | 4 | −6.34515 | 5.21956 | 0.83192 | −3.41379 |
| 3 | 9 | 8.54029 | 4.59519 | −3.13860 | −4.16048 |
| 4 | 16 | 17.41606 | 1.90000 | 1.06147 | −0.19109 |

| Unit | Lens surface | Magnification (WE) | Magnification (ST) | Magnification (TE) |
|---|---|---|---|---|
| 1 | 1-3 | 0. | 0. | 0. |
| 2 | 4-8 | −0.38075 | −0.50427 | −0.94990 |
| 3 | 9-15 | −0.90578 | −1.43010 | −1.71418 |
| 4 | 16-17 | 0.70682 | 0.72804 | 0.71337 |

EXAMPLE 3 unit mm

Surface data

| Surface no. | r | d | nd | vd | ER |
|---|---|---|---|---|---|
| object plane | ∞ | ∞ |  |  |  |
| 1 | 13.0936 | 0.8000 | 1.84666 | 23.78 | 7.108 |
| 2 | 9.5633 | 3.0700 | 1.58233 | 59.30 | 6.358 |
| 3* | −156.7532 | Variable |  |  | 6.000 |
| 4* | −14.0421 | 0.7000 | 1.52542 | 55.78 | 5.297 |
| 5* | 7.3019 | 2.7913 |  |  | 3.491 |
| 6 | −5.6436 | 0.4100 | 1.61772 | 49.81 | 3.123 |
| 7 | 415.5818 | 1.0824 | 1.92286 | 18.90 | 3.095 |
| 8 | −17.5973 | Variable |  |  | 3.080 |
| 9 (S) | ∞ | −0.1000 |  |  | 1.972 |
| 10* | 7.5909 | 2.2203 | 1.58233 | 59.30 | 2.071 |
| 11* | −19.1485 | 0.2000 |  |  | 2.230 |
| 12 | 3.7120 | 1.4106 | 1.48749 | 70.23 | 2.488 |
| 13 | 4.6767 | 0.4256 | 1.63387 | 23.38 | 2.320 |
| 14 | 6.9588 | 0.4000 | 2.10224 | 16.80 | 2.283 |
| 15 | 3.7589 | Variable |  |  | 2.130 |
| 16* | 57.5660 | 1.9000 | 1.53113 | 55.80 | 4.450 |
| 17 | −9.9437 | Variable |  |  | 4.419 |
| 18 | ∞ | 0.5000 | 1.51633 | 64.14 | 4.297 |
| 19 | ∞ | 0.5000 |  |  | 4.287 |
| 20 | ∞ | 0.5000 | 1.51633 | 64.14 | 4.272 |
| 21 | ∞ | 0.6000 |  |  | 4.269 |
| Image plane (Light receiving surface) | ∞ |  |  |  |  |

Aspherical surface data

3rd surface

K = −8.3595, A4 = 1.8375E−05, A6 = 5.8109E−07, A8 = −2.0340E−08, A10 = 1.9804E−10

4th surface

K = −71.6612, A4 = −3.0044E−04, A6 = 5.7940E−05, A8 = −1.3391E−06, A10 = 9.2208E−09

5th surface

K = 0.1289, A4 = 1.9042E−03, A6 = −1.4539E−04, A8 = 1.1891E−05, A10 = 4.4260E−07

10th surface

K = −4.1034, A4 = 3.1675E−03, A6 = −2.7497E−05, A8 = 4.1470E−05, A10 = −2.4844E−06

11th surface

K = 5.0838, A4 = 3.2929E−03, A6 = 6.9940E−05, A8 = 3.1589E−05, A10 = 1.2445E−06

16th surface

K = −4987.0414, A4 = 9.1682E−04, A6 = −1.2999E−04, A8 = 8.0596E−06, A10 = −1.9272E−07

Zoom data
Zoom ratio 4.75

|  | WE | ST | TE |
|---|---|---|---|
| f (mm) | 6.5209 | 14.0147 | 30.9887 |
| Fno. | 3.3000 | 4.4353 | 5.0980 |
| 2ω (°) | 66.5065 | 30.5396 | 13.7582 |
| IH | 3.8400 | 3.8400 | 3.8400 |
| Lens total length | 32.9078 | 38.2233 | 42.6138 |
| BF | 5.2780 | 5.1115 | 4.8795 |
| Entrance pupil position | 10.8826 | 19.5130 | 38.6044 |
| Exit pupil position | −18.3188 | −60.4212 | −374.0226 |
| Front side principal point position | 15.0823 | 30.2770 | 67.0256 |
| Back side principal point position | −5.9276 | −13.4141 | −30.3718 |
| d3 | 0.41000 | 4.27335 | 9.23540 |
| d8 | 7.79938 | 4.09902 | 0.78643 |
| d15 | 4.11016 | 9.42923 | 12.40227 |
| d17 | 3.51854 | 3.35203 | 3.12005 |

Single lens data

| Lens no. | Lens surface | f |
|---|---|---|
| 1 | 1-2 | −46.7507 |
| 2 | 2-3 | 15.5841 |
| 3 | 4-5 | −9.0408 |
| 4 | 6-7 | −9.0104 |
| 5 | 7-8 | 18.3156 |
| 6 | 10-11 | 9.6291 |
| 7 | 12-13 | 24.9550 |
| 8 | 13-14 | 20.9805 |

-continued unit mm

| | | |
|---|---|---|
| 9 | 14-15 | −7.9362 |
| 10 | 16-17 | 16.1216 |

Zoom lens unit data

| Unit | Lens surface | Focal length | Lens structure length | Front side principal point position | Back side principal point position |
|---|---|---|---|---|---|
| 1 | 1 | 24.31038 | 3.87000 | −0.07465 | −2.46371 |
| 2 | 4 | −5.73845 | 4.98374 | 0.92419 | −3.06501 |
| 3 | 9 | 8.42832 | 4.55649 | −2.32920 | −3.80070 |
| 4 | 16 | 16.12163 | 1.90000 | 1.06857 | −0.18458 |

| Unit | Lens surface | Magnification (WE) | Magnification (ST) | Magnification (TE) |
|---|---|---|---|---|
| 1 | 1-3 | 0. | 0. | 0. |
| 1 | 1-3 | 0. | 0. | 0. |
| 2 | 4-8 | −0.38842 | −0.52595 | −0.96467 |
| 3 | 9-15 | −1.04385 | −1.63241 | −1.92952 |
| 4 | 16-17 | 0.66158 | 0.67146 | 0.68483 |

EXAMPLE 4 unit mm

Surface data

| Surface no. | r | d | nd | vd | ER |
|---|---|---|---|---|---|
| object plane | ∞ | ∞ | | | |
| 1 | 24.5168 | 0.6000 | 1.84666 | 23.78 | 6.606 |
| 2 | 8.2725 | 2.2100 | | | 5.695 |
| 3 | ∞ | 8.8000 | 1.90366 | 31.32 | 5.703 |
| 4 | ∞ | 0.2500 | | | 5.113 |
| 5 | 20.1217 | 1.7000 | 1.71999 | 50.23 | 5.000 |
| 6 | −17.6536 | Variable | | | 4.995 |
| 7 | −27.2420 | 0.5400 | 1.77250 | 49.60 | 4.247 |
| 8 | 24.1082 | 0.5200 | | | 3.968 |
| 9 | 1.447E+05 | 0.5200 | 1.77250 | 49.60 | 3.914 |
| 10 | 5.9386 | 1.2000 | 1.84666 | 23.78 | 3.641 |
| 11 | 16.2895 | Variable | | | 3.579 |
| 12(S) | ∞ | 0.5000 | | | 2.293 |
| 13* | 9.9094 | 1.3500 | 1.58913 | 61.14 | 2.577 |
| 14 | 32.1807 | Variable | | | 2.686 |
| 15 | 6.2434 | 3.2000 | 1.69350 | 53.21 | 4.086 |
| 16 | 61.3343 | 0.1000 | 1.63387 | 23.38 | 3.677 |
| 17 | 100.0000 | 0.6800 | 1.84666 | 23.78 | 3.664 |
| 18 | 5.4906 | 0.3500 | | | 3.301 |
| 19* | 5.5570 | 2.0000 | 1.52542 | 55.78 | 3.407 |
| 20* | 44.6917 | Variable | | | 3.264 |
| 21 | ∞ | 0.4200 | 1.55000 | 67.00 | 3.872 |
| 22 | ∞ | 0.5000 | | | 3.897 |
| 23 | ∞ | 0.5000 | 1.51633 | 64.14 | 3.944 |
| 24 | ∞ | 1.0000 | | | 3.975 |
| Image plane (Light receiving surface) | ∞ | | | | |

Aspherical surface data

13rd surface $K = 0, A4 = -9.1918E-05, A6 = -1.0450E-07, A8 = 0, A10 = 0$

19th surface $K = 0, A4 = -3.1583E-05, A6 = 2.1705E-06, A8 = 0, A10 = 0$

20th surface $K = 0, A4 = 1.7400E-03, A6 = 3.4700E-05, A8 = 2.8000E-06, A10 = 0$

Zoom data
Zoom ratio 2.91

| | WE | ST | TE |
|---|---|---|---|
| f (mm) | 6.5638 | 11.1334 | 19.1041 |
| Fno. | 3.5500 | 3.9184 | 4.3909 |
| 2ω (°) | 63.0579 | 37.3056 | 22.0679 |
| IH | 3.8400 | 3.8400 | 3.8400 |
| Lens total length | 50.6823 | 50.6752 | 50.6831 |
| BF | 10.4522 | 12.5045 | 14.5849 |
| Entrance pupil position | 9.4559 | 12.3626 | 14.3923 |
| Exit pupil position | −22.0229 | −20.8671 | −20.5262 |
| Front side principal point position | 14.0634 | 17.5559 | 15.7159 |
| Back side principal point position | −5.5654 | −10.1384 | −18.0975 |
| d6 | 0.65000 | 5.62151 | 9.91999 |
| d11 | 9.73925 | 4.76068 | 0.47000 |
| d14 | 5.32091 | 3.26854 | 1.18824 |
| d20 | 8.35144 | 10.40377 | 12.48418 |

Single lens data

| Lens no. | Lens surface | f |
|---|---|---|
| 1 | 1-2 | −15.0005 |
| 2 | 3-4 | ∞ |
| 3 | 5-6 | 13.3113 |
| 4 | 7-8 | −16.4808 |
| 5 | 9-10 | −7.6878 |
| 6 | 10-11 | 10.4811 |
| 7 | 13-14 | 23.7701 |
| 8 | 15-16 | 9.7901 |
| 9 | 16-17 | 250.0012 |
| 10 | 17-18 | −6.8845 |
| 11 | 19-20 | 11.8691 |

Zoom lens unit data

| Unit | Lens surface | Focal length | Lens structure length | Front side principal point position | Back side principal point position |
|---|---|---|---|---|---|
| 1 | 1 | 21.84598 | 13.56000 | 12.72703 | 10.38041 |
| 2 | 7 | −9.61061 | 2.78000 | 0.84428 | −0.85371 |
| 3 | 12 | 23.77014 | 1.85000 | 0.13032 | −1.20053 |
| 4 | 15 | 16.63883 | 6.33000 | −2.34233 | −5.75530 |

| Unit | Lens surface | Magnification (WE) | Magnification (ST) | Magnification (TE) |
|---|---|---|---|---|
| 1 | 1-6 | 0. | 0. | 0. |
| 2 | 7-11 | −0.45502 | −0.59508 | −0.81092 |
| 3 | 12-14 | −25.37568 | 8.81784 | 4.83913 |
| 4 | 15-20 | 0.02602 | −0.09712 | −0.22285 |

EXAMPLE 5 unit mm

Surface data

| Surface no. | r | d | nd | vd | ER |
|---|---|---|---|---|---|
| object plane | ∞ | ∞ | | | |
| 1 | 24.1815 | 0.6000 | 1.84666 | 23.78 | 6.677 |
| 2 | 8.4567 | 2.2100 | | | 5.774 |
| 3 | ∞ | 8.8000 | 1.90366 | 31.32 | 5.783 |

-continued unit mm

| | | | | | |
|---|---|---|---|---|---|
| 4 | ∞ | 0.2500 | | | 5.127 |
| 5 | 19.9143 | 1.7000 | 1.71999 | 50.23 | 5.000 |
| 6 | −18.2418 | Variable | | | 4.993 |
| 7 | −25.3495 | 0.5400 | 1.77250 | 49.60 | 4.263 |
| 8 | 14.0525 | 0.5200 | | | 3.915 |
| 9 | −1566.4118 | 0.5200 | 1.71999 | 50.23 | 3.923 |
| 10 | 7.1240 | 1.2000 | 1.84666 | 23.78 | 3.743 |
| 11 | 25.6235 | Variable | | | 3.683 |
| 12 (S) | ∞ | 0.5000 | | | 2.318 |
| 13* | 10.2144 | 1.3500 | 1.58913 | 61.14 | 2.596 |
| 14 | 35.5160 | Variable | | | 2.706 |
| 15 | 6.2851 | 2.8291 | 1.69350 | 53.21 | 4.006 |
| 16 | 16.5815 | 0.7590 | 1.63387 | 23.38 | 3.619 |
| 17 | 100.0000 | 0.6800 | 1.92286 | 20.88 | 3.528 |
| 18 | 5.9861 | 0.3500 | | | 3.233 |
| 19* | 6.0036 | 2.0000 | 1.52542 | 55.78 | 3.332 |
| 20* | 151.7724 | Variable | | | 3.220 |
| 21 | ∞ | 0.4200 | 1.55000 | 67.00 | 3.874 |
| 22 | ∞ | 0.5000 | | | 3.898 |
| 23 | ∞ | 0.5000 | 1.51633 | 64.14 | 3.943 |
| 24 | ∞ | 1.0000 | | | 3.972 |
| Image plane (Light receiving surface) | ∞ | | | | |

Aspherical surface data

13rd surface

K = 0, A4 = −9.1918E−05, A6 = −1.0450E−07, A8 = 0, A10 = 0

19th surface

K = 0, A4 = −3.1583E−05, A6 = 2.1705E−06, A8 = 0, A10 = 0

20th surface

K = 0, A4 = 1.7400E−03, A6 = 3.4700E−05, A8 = 2.8000E−06, A10 = 0

Zoom data (∞)
Zoom ratio 2.92

| | WE | ST | TE |
|---|---|---|---|
| f (mm) | 6.5581 | 11.1269 | 19.1330 |
| Fno. | 3.5500 | 3.9214 | 4.4003 |
| 2ω (°) | 62.8981 | 37.1665 | 22.0029 |
| IH | 3.8400 | 3.8400 | 3.8400 |
| Lens total length | 50.6823 | 50.6893 | 50.6746 |
| BF | 10.4207 | 12.4818 | 14.5773 |
| Entrance pupil position | 9.4860 | 12.5303 | 14.7573 |
| Exit pupil position | −21.6256 | −20.6299 | −20.4039 |
| Front side principal point position | 14.0553 | 17.6558 | 15.9490 |
| Back side principal point position | −5.5597 | −10.1396 | −18.1233 |
| d6 | 0.65000 | 5.64938 | 9.95713 |
| d11 | 9.78494 | 4.79270 | 0.47000 |
| d14 | 5.01853 | 2.95736 | 0.86209 |
| d20 | 8.32001 | 10.38110 | 12.47654 |

Single lens data

| Lens no. | Lens surface | f |
|---|---|---|
| 1 | 1-2 | −15.6335 |
| 2 | 3-4 | ∞ |
| 3 | 5-6 | 13.4746 |
| 4 | 7-8 | −11.6338 |
| 5 | 9-10 | −9.8484 |
| 6 | 10-11 | 11.3179 |
| 7 | 13-14 | 23.8656 |
| 8 | 15-16 | 13.1188 |
| 9 | 16-17 | 31.2487 |
| 10 | 17-18 | −6.9235 |
| 11 | 19-20 | 11.8409 |

Zoom lens unit data

| Unit | Lens surface | Focal length | Lens structure length | Front side principal point position | Back side principal point position |
|---|---|---|---|---|---|
| 1 | 1 | 21.96758 | 13.56000 | 12.62242 | 9.95954 |
| 2 | 7 | −9.58131 | 2.78000 | 0.53604 | −1.18623 |
| 3 | 12 | 23.86564 | 1.85000 | 0.16369 | −1.16935 |
| 4 | 15 | 16.94925 | 6.61810 | −2.35415 | −5.97336 |

| Unit | Lens surface | Magnification (WE) | Magnification (ST) | Magnification (TE) |
|---|---|---|---|---|
| 1 | 1-6 | 0. | 0. | 0. |
| 2 | 7-11 | −0.45281 | −0.59289 | −0.80837 |
| 3 | 12-14 | −20.07144 | 9.69734 | 5.05718 |
| 4 | 15-20 | 0.03285 | −0.08810 | −0.21305 |

Values of conditional expressions in each of embodiments are as shown below.
Conditional Expressions
(1) Neff−0.01veff
(2) Neff−Ndet
(3) vdet−veff
(4) Rle2
(5) Rre2/Rle2
Values of Conditional Expressions

| | Expression | | | | |
|---|---|---|---|---|---|
| | (1) | (2) | (3) | (4) | (5) |
| Example 1 | 2.18848 | 0.74985 | 44.93 | 5.6412 | 1.6846 |
| Example 2 | 3.05327 | 1.59834 | 46.56 | 4.6960 | 1.4990 |
| Example 3 | 9.92170 | 8.41657 | 51.58 | 4.6767 | 1.4880 |
| Example 4 | 2.36323 | 0.9.521 | 46.04 | 61.3343 | 1.6304 |
| Example 5 | 3.35458 | 1.91716 | 46.98 | 16.5815 | 6.0308 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 11:
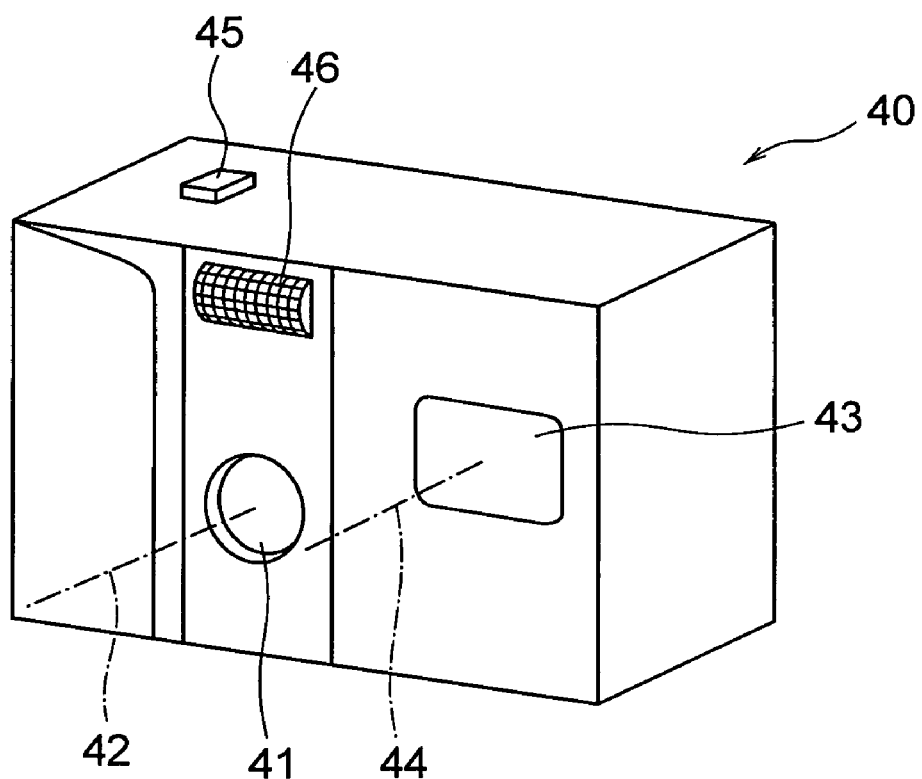
FIG. 11 is a front perspective view showing an appearance of a digital camera 40 in which, the zoom lens system according to the present invention is incorporated.
Figure 12:
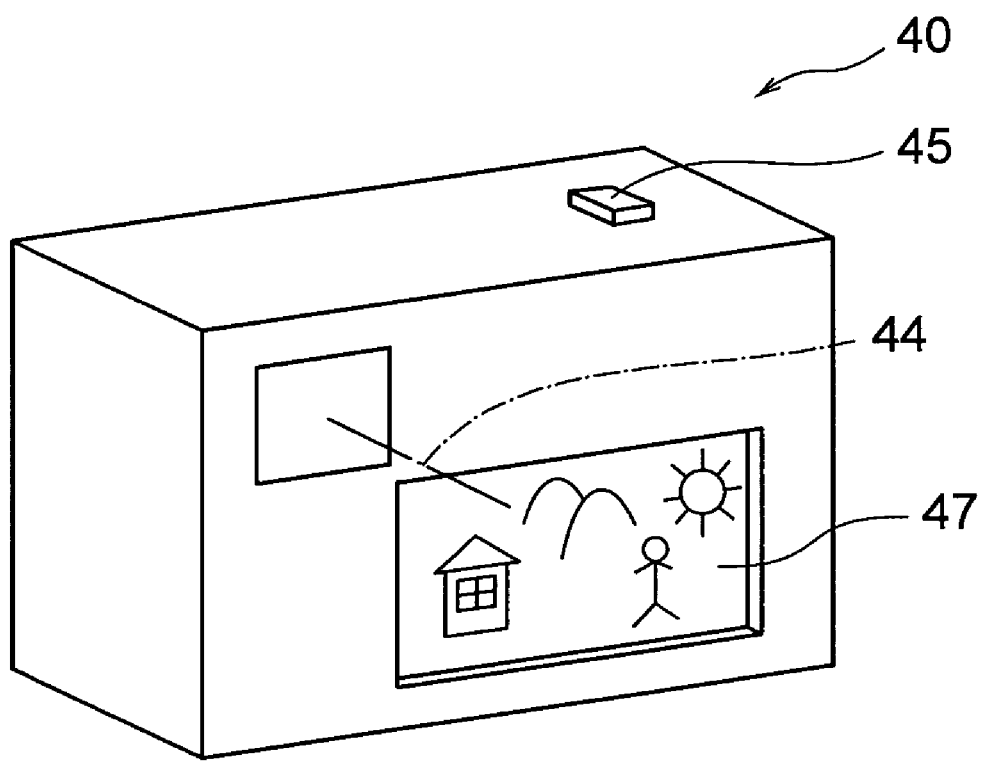
FIG. 12 is a rear perspective view of the digital camera 40.
Figure 13:
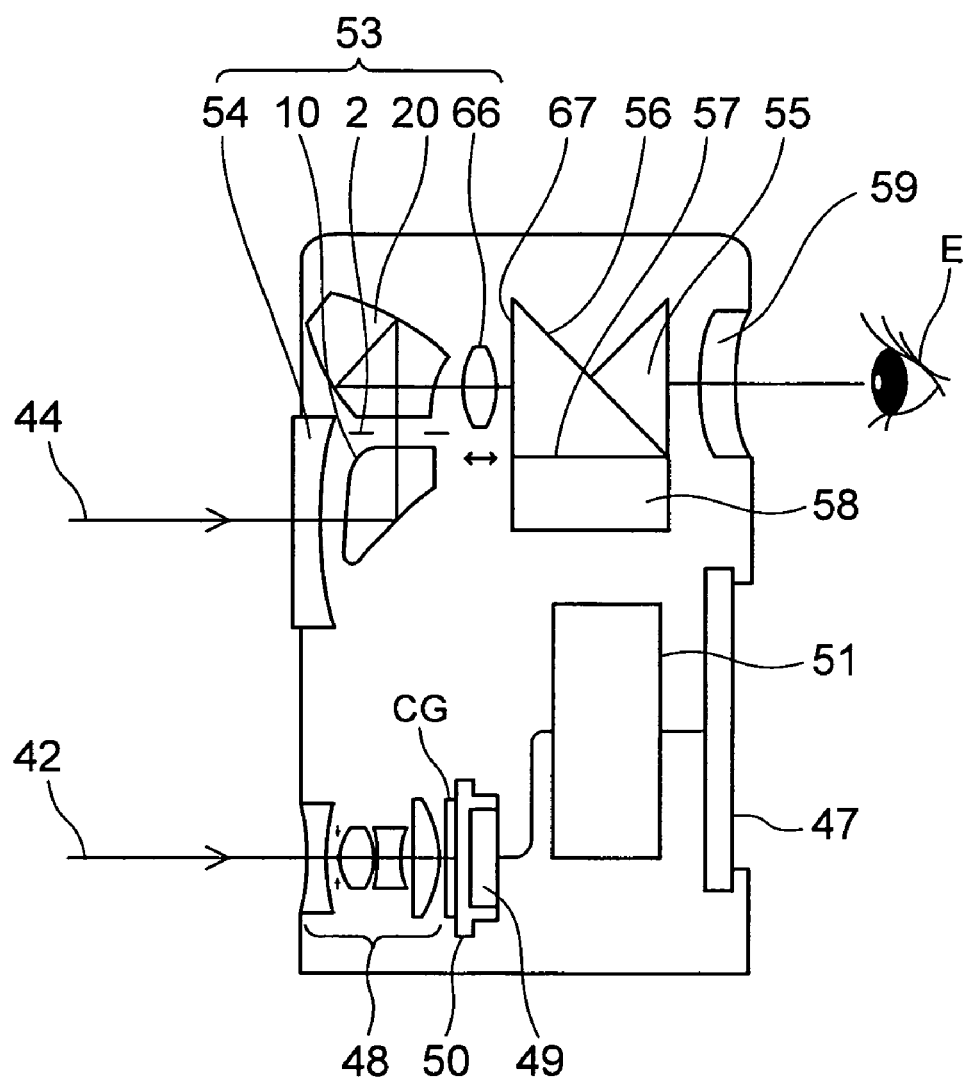
FIG. 13 is a cross-sectional view showing an optical structure of the digital camera 40.

In FIG. 11 to FIG. 13 show conceptual diagrams of structures in which the image forming optical system according to the present invention is incorporated in a photographic optical system 41 of a digital camera. FIG. 77 is a frontward perspective view showing an appearance of a digital camera 40, FIG. 78 is a rearward perspective view of the same, and FIG. 79 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 14:
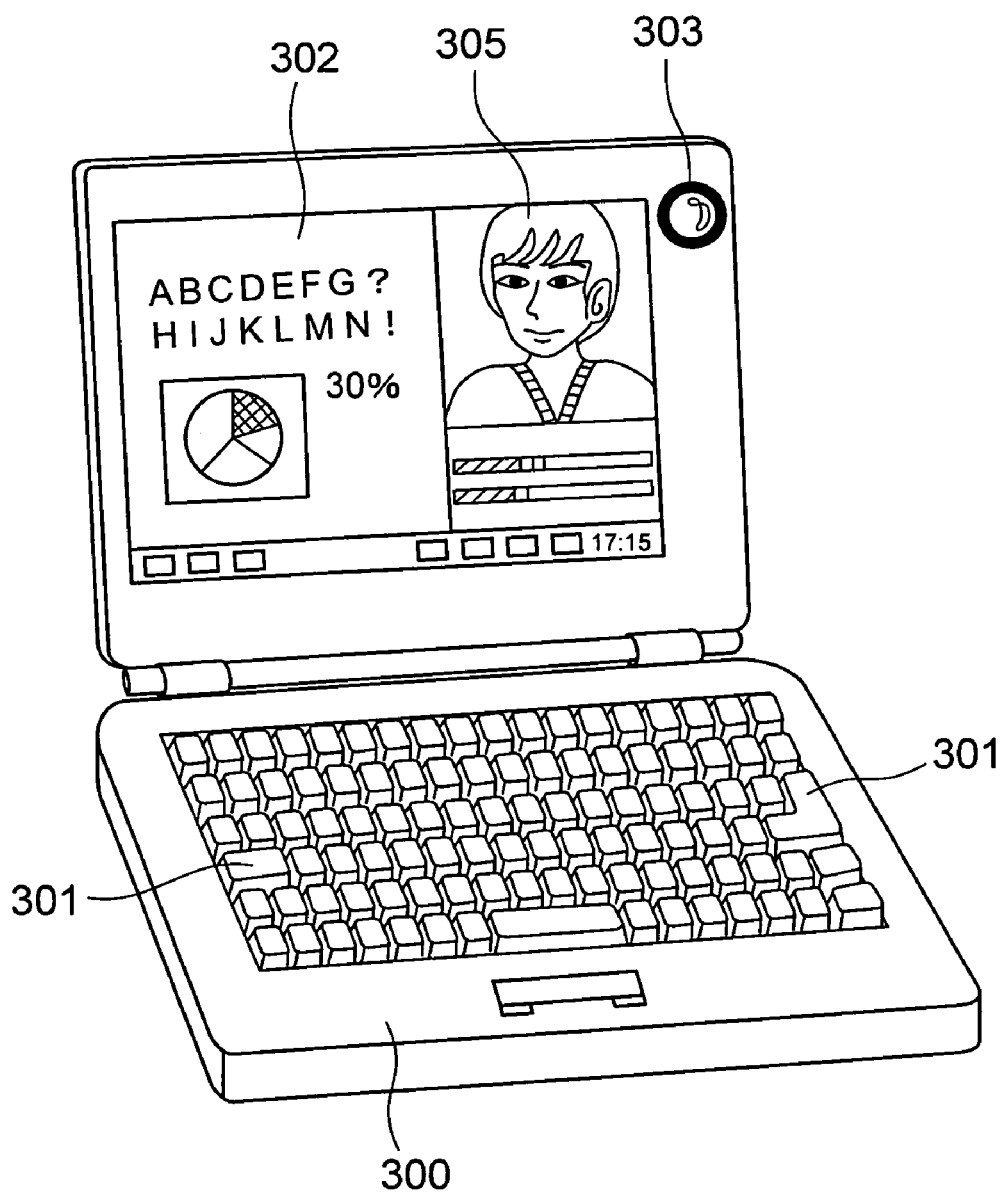
FIG. 14 is a front perspective view of a state in which, a cover of a personal computer 300, which is an example of an information processing apparatus in which the zoom lens system of the present invention is built-in as an objective optical system, is opened.
Figure 15:
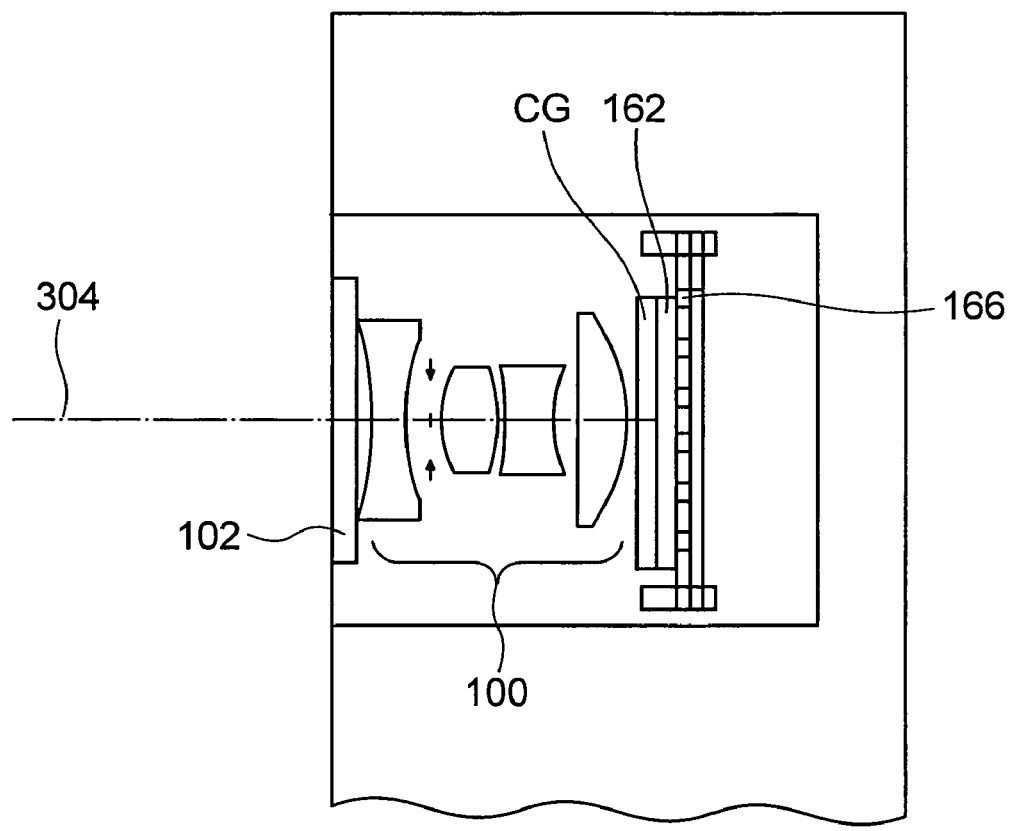
FIG. 15 is a cross-sectional view of a photographic optical system 303 of the personal computer 300.
Figure 16:
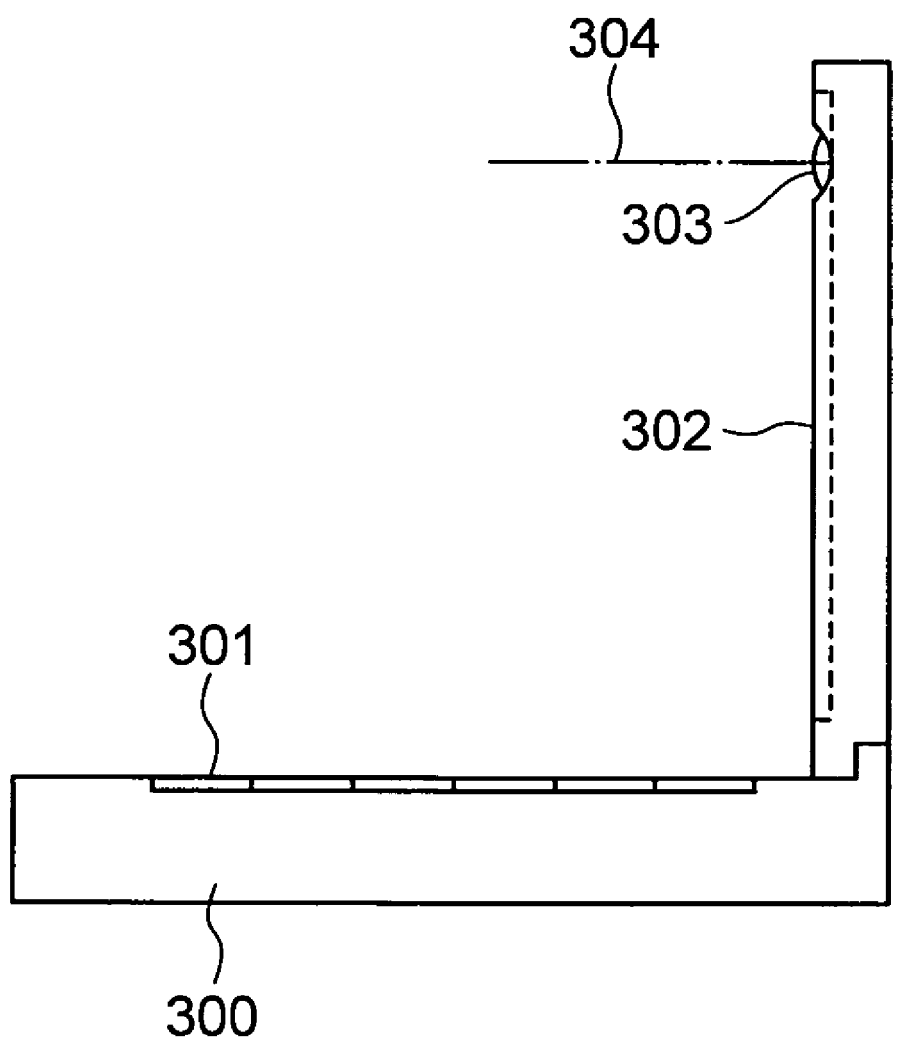
FIG. 16 is a side view of the personal computer 300.

Next, a personal computer which is an example of an information processing apparatus with a built-in image forming system as an objective optical system is shown in FIG. 14 to FIG. 16. FIG. 14 is a frontward perspective view of a personal computer 300 with its cover opened, FIG. 15 is a cross-sectional view of a photographic optical system 303 of the personal computer 300, and FIG. 16 is a side view of FIG. 80. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 17A:
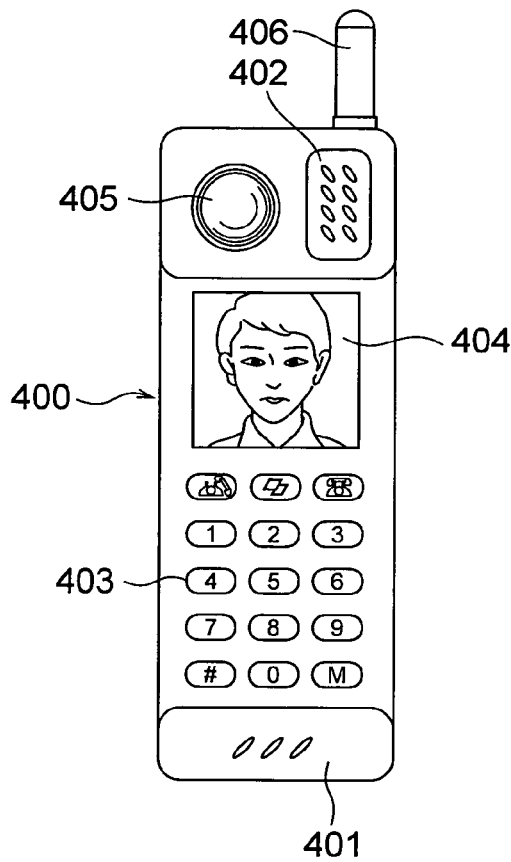
FIG. 17A, FIG. 17B, and FIG. 17C are diagrams showing a cellular phone which is an example of an information processing apparatus in which the zoom lens system of the present invention is built-in as a photographic optical system, where.
Figure 17B:
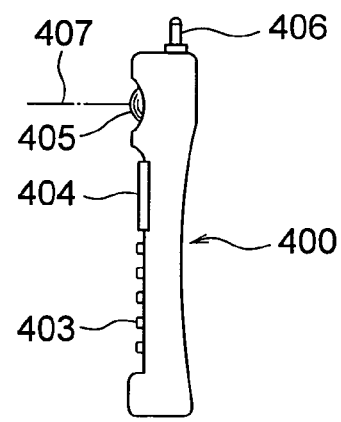
Figure 17C:
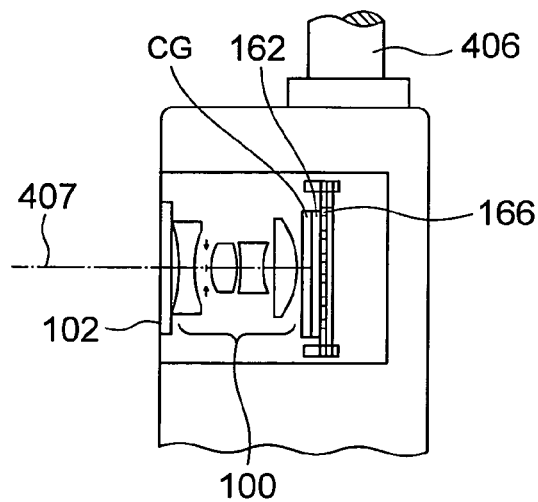

Next, a telephone which is an example of an information processing apparatus in which the image forming optical system of the present invention is built-in as a photographic optical system, particularly a portable telephone which is easy to carry is shown in FIG. 17A, FIG. 17B, and FIG. 17C. FIG. 17A is a front view of a portable telephone 400, FIG. 17B is a side view of the portable telephone 400, and FIG. 17C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Further, the present invention could have various modifications within the scope of the present invention.

The present invention is useful for an image forming optical system and an electronic image pickup apparatus in which, it is possible to make short an overall length of the optical system, to correct various aberrations favorably, and to achieve a high optical performance over the entire zooming area.

In the image forming optical system and the electronic image pickup apparatus according to the present invention, it is possible to make short the overall length of the optical system, to correct various aberrations favorably, and to achieve a high optical performance over the entire zooming area.

What is claimed is:

1. An image forming optical system comprising:
   at least one cemented lens, wherein
   the cemented lens includes a first lens element e1, a second lens element e2, and a third lens element e3, and
   the first lens element e1 is cemented to a surface on one side of the second lens element e2, and the third lens element e3 is cemented to the other surface of the second lens element e2, and
   the first lens element e1 is a positive lens, and
   a combined refracting power of the second lens element e2 and the third lens element e3 is negative, and
   the cemented lens satisfies the following conditional expression (1)

$$2.15 < Neff - 0.01 veff < 15.0 \qquad (1)$$

where,
   Neff denotes an effective refractive index when the cemented lens is assumed to be one lens, and is expressed by the following expression $$N_{eff} = \frac{1}{P \cdot F_{eff}} \text{ where } P = \sum_{i=1}^{3} \frac{1}{n_i f_i} \quad \frac{1}{F_{eff}} = \sum_{i=1}^{3} \frac{1}{f_i}$$

and
   ν eff is an effective Abbe's number when the cemented lens is assumed to be one lens, and is expressed by the following expression $$v_{eff} = \frac{1}{F_{eff} \cdot \sum_{i=1}^{3} \frac{1}{f_i \cdot v_{d,i}}}$$

where,
   P denotes Petzval's sum,
   $F_{eff}$ is a combined focal length of the cemented lens when three lenses are in close contact as the cemented lens, and each lens element is let to be thin,
   $n_i$ is a refractive index of a lens element which forms the cemented lens,
   $f_i$ is a focal length of a lens element which forms the cemented lens, and
   $v_{d,i}$ is Abbe's number of the lens element which forms the cemented lens,
   wherein the lens unit having at least the one cemented lens includes at least one positive lens et apart from the cemented lens, and
   the image forming optical system satisfies the following conditional expressions (2) and (3-2)

$$0.73 < Neff - Ndet < 13 \qquad (2)$$

$$44.93 \leq vdet - veff < 100 \qquad (3-2)$$

where,
   Ndet and ν det denote a refractive index and Abbe's number respectively of the positive lens et.

2. The image forming optical system according to claim 1, wherein the image forming optical system satisfies the following conditional expression (1-1)

$$2.17 < Neff - 0.01 veff < 13.0 \qquad (1-1).$$

3. The image forming optical system according to one of claims 1 and 2, wherein a refracting power of the cemented lens is negative.

4. The image forming optical system according to claim 1, wherein the image forming optical system satisfies the following conditional expressions (2-1) and (3-3);

$$0.74 < Neff - Ndet < 11 \qquad (2-1)$$

$$44.93 \leq vdet - veff < 90 \qquad (3-3)$$

where,
   Ndet and ν det denote a refractive index and Abbe's number respectively of the positive lens et.

5. An electronic image pickup apparatus comprising:
   an image forming optical system according to claim 1; and
   an electronic image pickup element.

6. The image forming optical system according to claim 1, comprising:
   a first lens unit having a positive refracting power;
   a second lens unit having a negative refracting power; and
   rear lens units having a positive refracting power, wherein one lens units having a positive refracting power in the rear lens units has at least the one cemented lens.

7. The image forming optical system according to claim 6, wherein
   the rear lens units includes a third lens unit having a positive refracting power, and
   the third lens unit includes at least the one cemented lens.

8. An image forming optical system according to claim 1, wherein the second lens element e2 is made of resin.

9. An image forming optical system according to claim 8, wherein the resin is an energy curable resin.

10. An image forming optical system according to claim 9, wherein the resin is an ultraviolet curable resin.

11. An image forming optical system comprising:
    at least one cemented lens, wherein
    the cemented lens includes a first lens element e1, a second lens element e2, and a third lens element e3, and
    the first lens element e1 is cemented to a surface on one side of the second lens element e2, and the third lens element e3 is cemented to the other surface of the second lens element e2, and
    the first lens element e1 is a positive lens, and
    a combined refracting power of the second lens element e2 and the third lens element e3 is negative, and
    the cemented lens satisfies the following conditional expression (1)

$$2.15 < Neff - 0.01 veff < 15.0 \qquad (1)$$

where,
    Neff denotes an effective refractive index when the cemented lens is assumed to be one lens, and is expressed by the following expression $$N_{eff} = \frac{1}{P \cdot F_{eff}} \text{ where } P = \sum_{i=1}^{3} \frac{1}{n_i f_i} \quad \frac{1}{F_{eff}} = \sum_{i=1}^{3} \frac{1}{f_i}$$

and
    ν eff is an effective Abbe's number when the cemented lens is assumed to be one lens, and is expressed by the following expression $$v_{\text{eff}} = \cfrac{1}{F_{\text{eff}} \cdot \sum_{i=1}^{3} \cfrac{1}{f_i \cdot v_{d,i}}}$$ (5)

where,
P denotes Petzval's sum,
$F_{\text{eff}}$ is a combined focal length of the cemented lens when three lenses are in close contact as the cemented lens, and each lens element is let to be thin,
$n_i$ is a refractive index of a lens element which forms the cemented lens,
$f_i$ is a focal length of a lens element which forms the cemented lens, and
$v_{d,i}$ is Abbe's number of the lens element which forms the cemented lens,
wherein the image forming optical system satisfies the following conditional expressions (4) and (5)

$0 < R1e2$ (4)

$1 < Rre2/R1e2 < 200$ (5)

where,
Rre2 denotes a radius of curvature of a surface on an image side of the second lens element e2, and
R1e2 is a radius of curvature of a surface on an object side of the second lens element e2.

12. An image forming optical system comprising:
at least one cemented lens, wherein
the cemented lens includes a first lens element e1, a second lens element e2, and a third lens element e3, and
the first lens element e1 is cemented to a surface on one side of the second lens element e2, and the third lens element e3 is cemented to the other surface of the second lens element e2, and
the first lens element e1 is a positive lens, and
a combined refracting power of the second lens element e2 and the third lens element e3 is negative, and
the cemented lens satisfies the following conditional expression (1)

$2.15 < N\text{eff} - 0.01 v\text{eff} < 15.0$ (1)

where,
Neff denotes an effective refractive index when the cemented lens is assumed to be one lens, and is expressed by the following expression $$N_{\text{eff}} = \cfrac{1}{P \cdot F_{\text{eff}}} \text{ where } P = \sum_{i=1}^{3} \cfrac{1}{n_i f_i} \quad \cfrac{1}{F_{\text{eff}}} = \sum_{i=1}^{3} \cfrac{1}{f_i}$$

and
v eff is an effective Abbe's number when the cemented lens is assumed to be one lens, and is expressed by the following expression $$v_{\text{eff}} = \cfrac{1}{F_{\text{eff}} \cdot \sum_{i=1}^{3} \cfrac{1}{f_i \cdot v_{d,i}}}$$

where,
P denotes Petzval's sum,
$F_{\text{eff}}$ is a combined focal length of the cemented lens when three lenses are in close contact as the cemented lens, and each lens element is let to be thin,
$n_i$ is a refractive index of a lens element which forms the cemented lens,
$f_i$ is a focal length of a lens element which forms the cemented lens, and
$v_{d,i}$ is Abbe's number of the lens element which forms the cemented lens,
wherein the image forming optical system satisfies the following conditional expressions (4-1) and (5-1)

$0 < R1e2$ (4-1)

$1 < Rre2/R1e2 < 100$ (5-1)

where,
Rre2 denotes a radius of curvature of a surface on the image side of the second lens element e2, and
R1e2 denotes a radius of curvature of a surface on the object side of the second lens element e2.

* * * * *